(12) United States Patent
Sennett et al.

(10) Patent No.: US 9,398,619 B1
(45) Date of Patent: Jul. 19, 2016

(54) EMERGENCY ALERT NOTIFICATION AND VERIFICATION

(75) Inventors: DeWayne Allan Sennett, Redmond, WA (US); Brian Kevin Daly, Seattle, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 1318 days.

(21) Appl. No.: 11/833,017

(22) Filed: Aug. 2, 2007

(51) Int. Cl.
H04M 11/04 (2006.01)
H04W 76/00 (2009.01)

(52) U.S. Cl.
CPC .................. H04W 76/007 (2013.01)

(58) Field of Classification Search
USPC ............. 455/404.1, 404.2, 412.2, 414.1, 521
See application file for complete search history.

(56) References Cited

U.S. PATENT DOCUMENTS

| | | | | | |
|---|---|---|---|---|---|
| 5,847,657 | A * | 12/1998 | Tsuchiyama | ..... | H04W 52/0241 340/7.27 |
| 5,977,881 | A * | 11/1999 | Kido | ................ | H04W 52/0241 340/7.27 |
| 6,061,564 | A * | 5/2000 | Akeda | ............... | H04W 52/0216 340/7.32 |
| 6,112,075 | A | 8/2000 | Weiser | ........................ | 455/404 |
| 6,169,476 | B1 * | 1/2001 | Flanagan | .............. | G08B 21/10 340/286.02 |
| 2005/0202830 | A1 * | 9/2005 | Sudit | ..................... | H04W 4/028 455/456.1 |
| 2006/0040639 | A1 | 2/2006 | Karl et al. | .................. | 455/404.1 |
| 2006/0058005 | A1 * | 3/2006 | Dolezal | ............... | G08B 27/006 455/404.1 |
| 2007/0086399 | A1 * | 4/2007 | Akiyama | .............. | H04W 68/00 370/338 |
| 2007/0093296 | A1 * | 4/2007 | Asher | .................. | G06Q 20/102 463/42 |
| 2007/0210910 | A1 * | 9/2007 | Norstrom | ............. | G08B 27/001 340/506 |
| 2008/0318581 | A1 * | 12/2008 | Kim | ...................... | H04W 8/245 455/446 |
| 2008/0318591 | A1 * | 12/2008 | Oliver | ....................... | G01S 3/46 455/456.1 |

* cited by examiner

*Primary Examiner* — Christopher M Brandt
*Assistant Examiner* — Matthew Genack
(74) *Attorney, Agent, or Firm* — Baker & Hostetler LLP

(57) ABSTRACT

A device configured to determine whether it is outside a designated emergency alert area based on the number and/or frequency of received emergency alert system (EAS) signals. A communications network configured to map a location of the device with respect to the designated alert area and verify that the EAS alert signals were properly broadcast. The network may also be configured to transmit a signal to a second device indicating whether the device is outside the designated alert area. The network may further be configured to cause the EAS alert signals to be broadcast via a first transceiver serving at least a portion of the designated alert area and to cause non-emergency signals to be broadcast by a second transceiver serving at least a portion of an area outside of the designated alert area.

27 Claims, 16 Drawing Sheets

EMERGENCY ALERT NOTIFICATION AND VERIFICATION

BACKGROUND

The Emergency Alert System (EAS) enables federal, state, and/or local governments to provide timely messages and alerts to the public regarding various types of emergencies. For example, the public may receive messages pertaining to weather conditions, disasters, AMBER alerts (America's Missing: Broadcast Emergency Response), and the like. EAS supersedes the Emergency Broadcast System (EBS), and is jointly administered by the Federal Communications Commission (FCC), the Federal Emergency Management Agency (FEMA), and the National Weather Service (NWS).

EAS alerts may be issued nationally (i.e., across the entire United States) or within a specific geographic region within the United States. For example, an EAS alert may be issued for a specific area affected by a natural disaster, such as a hurricane or a flood. The area covered by the alert may span a portion of one or more states, and may cover tens or even hundreds of square miles depending on the type and severity of the emergency. Because the area covered by the EAS alert may not coincide with designated geographic boundaries, such as state or county borders, individuals may not be aware if they are currently within or near the emergency alert area. Furthermore, the size and shape of the alert area may be dynamic (i.e., the designated area may be subject to change) as the relevant government agencies receive more information regarding the scope of the emergency. Dynamic alert areas may be particularly problematic if an individual is attempting to evacuate the alert area but is unsure if or when he/she has reached a safe distance.

Upon being informed of an EAS alert that has been issued for a designated area, many individuals may be unaware or unsure if their friends or family are affected by the alert. For example, an individual may learn from a television news channel that a series of tornadoes struck near a family member's home. The individual may not be able to contact the family member through conventional means, such as a landline telephone, due to damage from the storm. In addition, the storm may significantly increase voice traffic over the communications network, leading to network congestion that limits the family member's ability to make and receive calls.

In addition to notifying the general public of an existing or impending emergency, the EAS alert may similarly notify public and/or private organizations, such as hospitals, that provide community support and infrastructure. Upon receiving the EAS alert, these organizations may be better able to prepare for and respond to the emergency. For example, if the EAS alert is received by a hospital located within or near the designated alert area, the hospital may request that all available staff report to work in anticipation of an increased number of patients. Moreover, the hospital may be able to requisition additional supplies and provisions to treat the increased number of patients. However, the originator of the EAS alert may have no means of verifying whether the hospital has received the EAS alert.

SUMMARY

Emergency alert system (EAS) alert signals may be transmitted to a device via a communications network. The EAS alert signals may include information designating an alert area. The device may be configured to determine whether it is outside the designated alert area based on whether the device receives the signals within a predetermined period of time. The device may also be configured to determine whether it is outside the designated alert based on whether a difference between the number of EAS alert signals received during two or more time intervals exceeds a predetermined value. The device may be further configured to generate data acknowledging receipt of one or more EAS alert signals and to transmit a signal indicative of the data via the network.

The communications network may be configured to receive from the device the signal acknowledging receipt of the EAS alert signal and to update a database to reflect the device's receipt of the EAS alert signal. The network may be further configured to determine and map a location of the device with respect to the designated alert area. The network may use the mapped location to verify that the EAS alert signal was properly broadcast.

The communications network may also receive one or more signals from the device indicative of the location of the device. The network may compare the location to the designated alert area and transmit a signal to the device indicating whether the device is outside the designated alert area. The network may also transmit a signal to a second device indicating whether the device is outside the designated alert area.

The communications network may also associate the EAS alert signal with the designated alert area and may associate a non-emergency signal with an area outside of the designated alert area. The network may correlate the EAS alert signal with a first transceiver serving at least a portion of the designated alert area. The network may further correlate the non-emergency signal with a second transceiver serving at least a portion of the area outside of the designated alert area. The network may deliver the EAS alert signal to the first transceiver and deliver the non-emergency signal to the second transceiver. The network may cause the EAS alert signal and the non-emergency signal to be broadcast by the first and second transceivers, respectively.

BRIEF DESCRIPTION OF THE DRAWINGS

The foregoing and other objects, aspects and advantages of the embodiments will be better understood from the following detailed description with reference to the drawings.

DETAILED DESCRIPTION OF ILLUSTRATIVE EMBODIMENTS

For purposes of illustration, various embodiments are described herein in connection with the Global System for Mobile Communication (GSM). The references to GSM are not exclusive, however, as it should be appreciated that embodiments may be implemented in connection with any type of wired or wireless access system, such as an intranet, the Internet, a local area network (LAN), a wide area network (WAN), a Public Switched Telephone Network (PSTN), a Code Division Multiple Access (CDMA) network, a Voice Over Internet Protocol (VoIP) network, and the like.

GSM is one of the most widely-used wireless access systems in today's fast growing communication systems. GSM provides circuit-switched data services to subscribers, such as mobile telephone or computer users. General Packet Radio Service (GPRS), which is an extension to GSM technology, introduces packet switching to GSM networks. GPRS uses a packet-based wireless communication technology to transfer high and low-speed data and signaling in an efficient manner. GPRS optimizes the use of network and radio resources, thus enabling the cost effective and efficient use of GSM network resources for packet mode applications.

Figure 1:
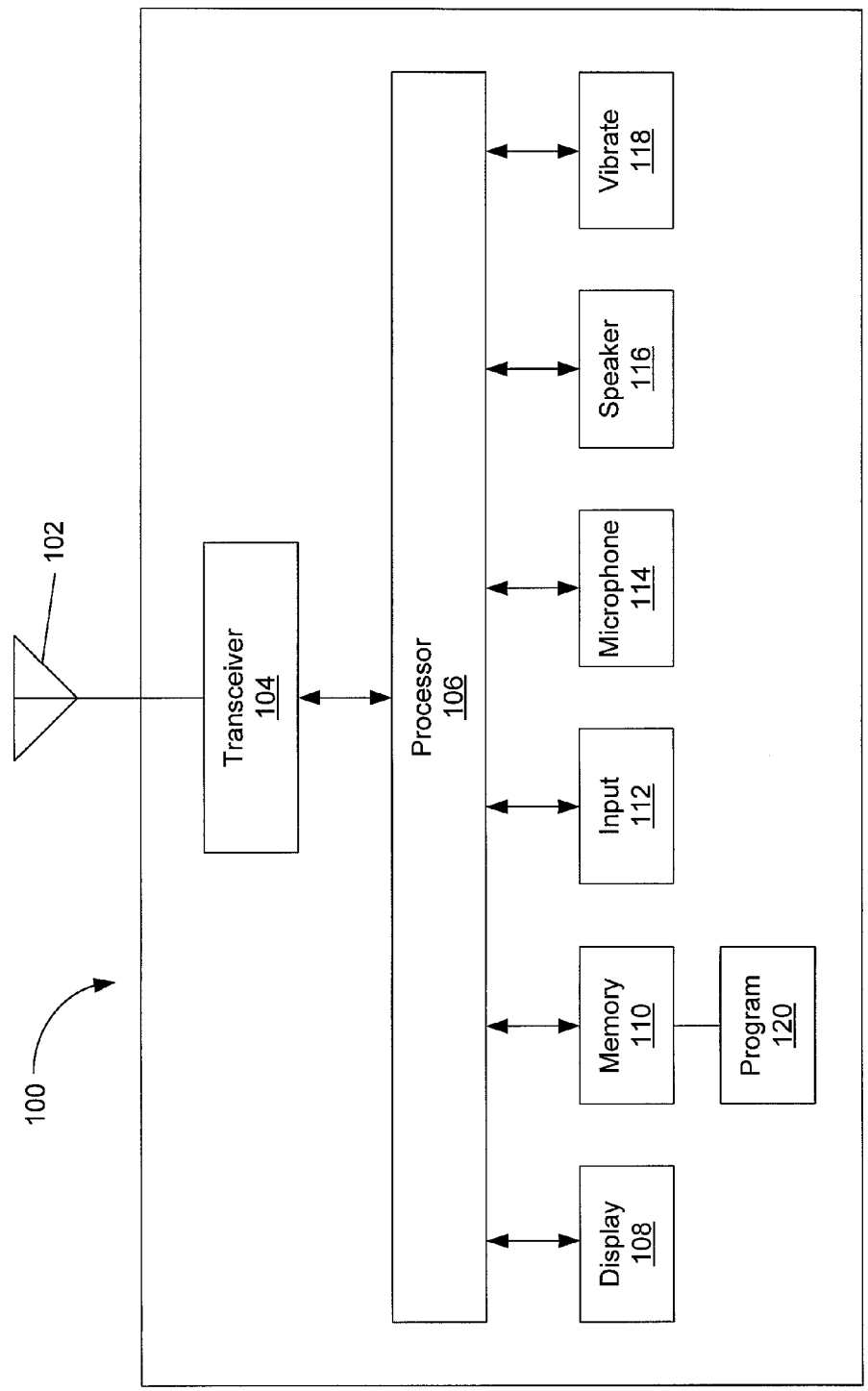
FIG. 1 is a block diagram of an example communications device that may be used in conjunction with an embodiment and/or in which aspects of an embodiment may be implemented.

FIG. 1 is a block diagram of a communications device 100 for communicating via a wireless network (not shown), such as a GSM network. The communications device 100 may send and receive voice and data signals to other devices and terminals connected to the wireless network. For example, the communications device 100 may send and receive voice calls, text messages, photographs, emails, video, and the like. The communications device 100 may also receive emergency alert system (EAS) alerts associated with a designated emergency alert area. The EAS alerts may be issued by an emergency alert network, which may include an emergency operations center (EOC). The emergency alert network may be in communication with the wireless network. In one embodiment, the communications device 100 may determine whether it is outside of the designated alert area based on the number and/or frequency of EAS alert signals it received from the wireless network.

The communications device 100 may be any suitable mobile communications device, such as a cellular telephone, laptop, or a personal digital assistant (PDA), although fixed-line communications devices are also consistent with an embodiment. As shown in FIG. 1, the communications device 100 may include an antenna 102, a transceiver 104, a processor 106, a display 108, a memory 110, an input component 112, a microphone 114, a speaker 116, and a vibrating mechanism 118.

The processor 106 may be in communication with the transceiver 104, the display 108, the memory 110, the input component 112, the microphone 114, the speaker 116, and the vibrating mechanism 118. The processor 106 may be any suitable microprocessor for operating the communications device 100. The transceiver 104 may transmit and receive wireless signals over the wireless network via the antenna 102.

The input component 112 may include a keypad, a touch screen, a scroll wheel, a voice recognition module, and the like. The display 108 may include a liquid crystal display, and may be capable of displaying various types of information and data, such as text, pictures, photos, and video. The input component 112 and the display 108 may enable a user to enter, access, and/or manipulate information stored in the communications device 100. For example, the user may use the input component 112 to enter and store phone numbers, email addresses, photographs, etc., into the memory 110. The microphone 114 may enable the communications device 100 to receive audio signals from the user, and the speaker 116 may enable the communications device 100 to transmit audio signals to the user.

The memory 110 may include any type of suitable storage component, such as random access memory (RAM), read only memory (ROM), programmable read only memory (PROM), and the like. In addition, the memory 110 may be physically integrated into the communications device 100 and/or removably attached. For example, the memory 110 may include an integrated internal memory module and/or a Subscriber Identity Module (SIM) card. The memory 110 may store information associated with the user of the device 100. For example, the memory 110 may store user preferences, contact lists, voice messages, text messages, instant messages, email, pictures, video, music, games, and the like. The memory 110 may also store a computer-executable program 120.

The computer-executable program 120 may include software instructions that can be executed by the processor 106 to perform one or more computing tasks, such as rendering email messages, phone lists, games, etc. In an embodiment, the computer-executable program 120 may be configured to enable the processor 106 to determine if the communications device 100 is outside a geographic area associated with an issued EAS alert. The EAS alert may be issued as a result of an emergency, such an impending hurricane that is likely to affect the geographic area. The wireless network may broadcast an EAS alert signal associated with the issued EAS alert. The transceiver 104 of the device 100 may receive the broadcast EAS alert signal via the antenna 102. Upon receiving the EAS alert signal at the transceiver 104, the processor 106 may determine that the signal corresponds to the issued EAS alert and cause the device 100 to render an EAS alert notification.

For example, the processor 106 may cause text and/or any type of image to be displayed via the display 108. The text and/or images on the display 108 may notify the user of the type, severity and/or area affected by the emergency. The display 108 may also notify the user of possible evacuation routes. For example, the display 108 may depict a map illustrating how the user may evacuate the designated alert area. The display 108 may also notify the user of shelter locations and other meeting places that have been set-up to assist people affected by the emergency. It will be appreciated that the display 108 may render any type of information associated with or relevant to the emergency.

Upon receiving the EAS alert signal, the processor 106 may also cause an audible sound to emit from the speaker 116. The audible sound may correspond to the EAS alert signal. That is, the audible sound may be of a predetermined tone and/or volume that is emitted from the speaker 116 whenever the EAS alert signal is received by the communications device 100. Thus, the audible sound may notify the user of the emergency without the user having to look at the display 108. In addition to, or in lieu of, causing the speaker 116 to emit the audible sound, the processor 106 may cause the device 100 to vibrate via the vibrating mechanism 118. As will be appreciated by one skilled in the art, the vibrating mechanism 118 may be advantageous if the user is carrying the device 100 in his or her pocket and has muted the speaker 116, for example.

After the user has been notified of the emergency via the communications device 100, the user may proceed to take appropriate action, such as evacuate the designated alert area. However, the designated alert area may not coincide with predetermined geographic boundaries, such as state or county borders. Furthermore, the size and shape of the alert area may be subject to change as the public and/or private agencies responsible for responding to the emergency receive more information regarding the scope and type of the emergency. This may make it difficult for the user to determine whether he/she has reached a safe distance, i.e., determine whether he/she is outside of the designated alert area. Thus, the processor 106 may continue to monitor whether additional EAS alert signals have been received by the transceiver 104.

For example, after receiving the first EAS alert signal, the processor 106 may determine whether any additional EAS alert signals have been received by the transceiver 104 within a predetermined period of time after the receipt of the first EAS alert signal. More specifically, as the user moves away from the designated alert area, the user may move farther from the cellular site(s) broadcasting the EAS alert signals. As a result, the device 100 may begin receive EAS alert signals less frequently. Thus, in an embodiment, the processor 106 may determine if additional EAS alert signals have been received within ten minutes of the first received EAS alert signal, though it will be appreciated that any suitable time period may be used.

In this example, if one or more EAS alert signals have been received within ten minutes of the first received EAS alert signal, the device 100 may continue to render the EAS alert notification to the user as described above. If no EAS alert signals have been received within ten minutes of the first received EAS alert signal, the processor 106 may cause the device 100 to render a notification informing the user, via any one of the display 108, the speaker 116, and/or the vibrating mechanism 118, that the user may no longer be within the designated alert area. If the user should intentionally or accidentally re-enter the designated alert area, the device 100 may receive the EAS alert signals more frequently. Consequently, the processor 106 may cause the device 100 to again render the EAS alert notification if the device 100 subsequently receives two or more EAS alert signals within the ten minute interval.

In another embodiment, the processor 106 may determine whether a predetermined number of EAS alert signals have been received by the transceiver 104 within a predetermined period of time. For example, the processor 106 may determine if five EAS alert signals are received by the transceiver 104 within a ten minute interval, though any suitable number of EAS alert signals and any suitable time period are consistent with an embodiment. If five EAS alert signals are received within the ten minute interval, the communications device 100 may render the EAS alert notification as described above. If five EAS alert signals are not received within the ten minute interval, the processor 106 may cause the device 100 to notify the user, via any one of the display 108, the speaker 116, and/or the vibrating mechanism 118, that the user may not be within the designated alert area.

In yet another embodiment, the processor 106 may determine the number of EAS alert signals that have been received by the transceiver 104 during multiple time intervals. The time intervals may be predetermined or may be randomly selected by the processor 106. The processor 106 may also determine the difference between the number of received EAS alert signals during the multiple time intervals and whether the difference exceeds a predetermined threshold value. For example, the processor 106 may determine that eight EAS alert signals were received by the transceiver 104 during a first time interval and that four EAS alert signals were received during a second subsequent time interval. The processor 106 may further determine that the difference between the first and second time intervals is four EAS alert signals and that the difference reflects a reduction in the number of received EAS alert signals. If the predetermined threshold value is set to three, for example, the processor 106 may determine that the difference exceeds the threshold value and may cause the device 100 to notify the user, via any one of the display 108, the speaker 116, and/or the vibrating mechanism 118, that the user may not be within the designated alert area.

It will be appreciated that the predetermined period of time in one or more of the above embodiments may be based upon the average time between previously received EAS alert signals.

Figure 2:
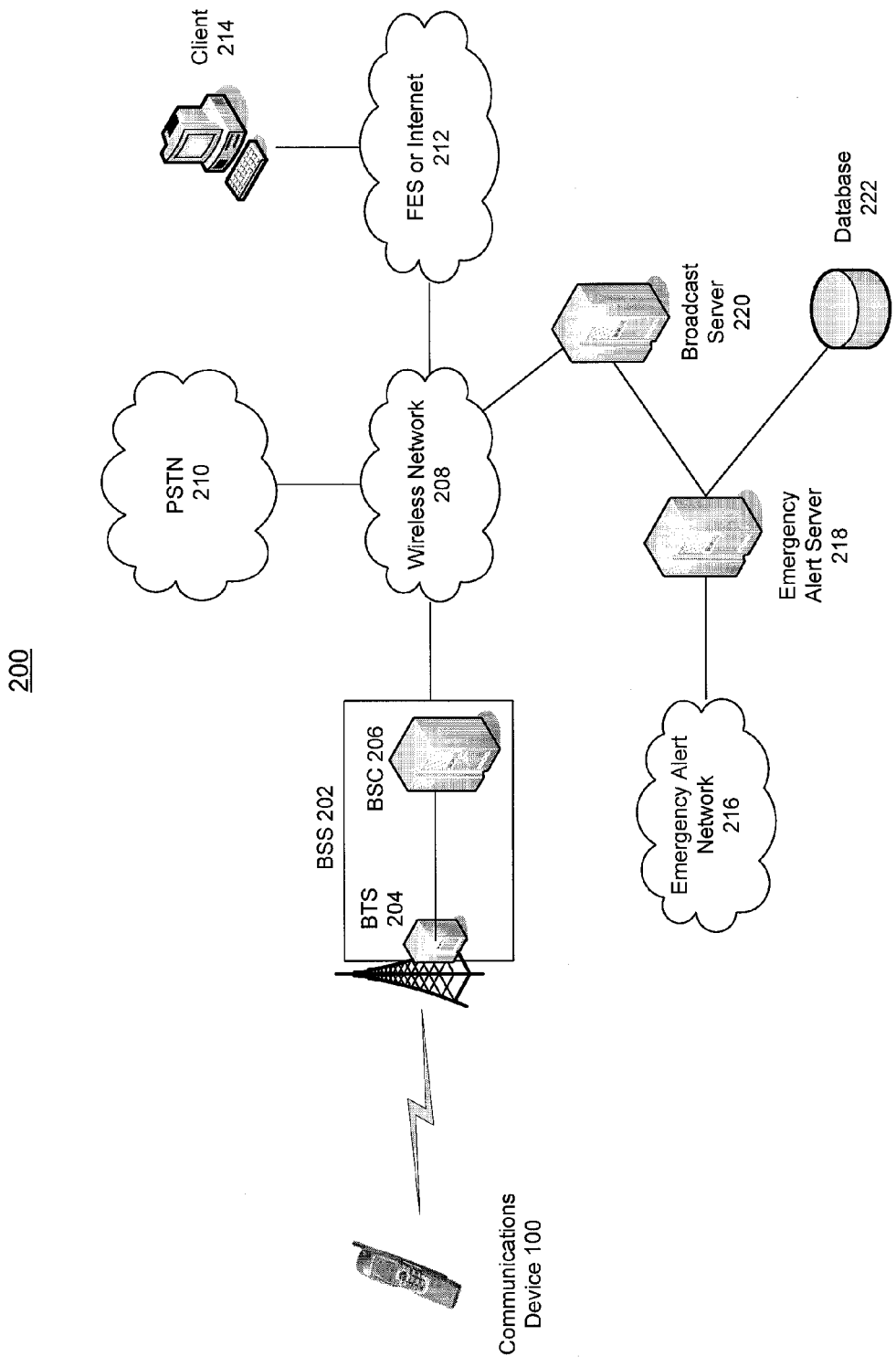
FIG. 2 is a diagram illustrating an example communications network that may be used in conjunction with an embodiment and/or in which aspects of an embodiment may be implemented.

FIG. 2 illustrates an example communications network 200 that may be configured to communicate EAS alert signals and related information with the communications device 100. As shown FIG. 2, the communications device 100 may be in communication with a base station subsystem (BSS) 202, which may include a base transceiver station (BTS) 204 and a base station controller (BSC) 206. The BSS 202 may be in communication with a wireless network 208. The wireless network 208 may be in communication with a public switched telephone network 210, a fixed-end system (FES) or Internet 212, and a EAS broadcast server 220. The broadcast server 220 may be in communication with an emergency alert server 218, which may be connected to an emergency alert network 216 and a database 222. Though the broadcast server 220, the emergency alert server 218, and the database 222 are depicted as individual network elements, it will be appreciated that such elements may be a single network element and/or may be located at any suitable location in the communications network 200. For example, the broadcast server 220, the emergency alert server 218, and/or the database 222 may be considered part of the emergency alert network 216 or the wireless network 208.

In an embodiment, an EAS alert may be issued by the emergency alert network 216 in response to an emergency, such as an impending hurricane or tornado. The emergency alert network 216 may provide the EAS alert to the emergency alert server 218. The EAS alert may identify the geographic alert area, or areas, in which the alert is to be broadcast. The designated alert area may be determined in any appropriate manner.

The area indicated in the EAS alert may include a statically defined alert area, a dynamically defined alert area, or a combination of both. A statically defined alert area may be specified in the alert message, utilizing for example, geographic code references such as the Federal Information Processing Standard (FIPS), ZIP codes, and/or the National Weather Service Specific Area Message Encoder (SAME) codes. A dynamically defined alert area may be specified in the alert message, utilizing for example, geometric shapes, such as polygons, formatted in accordance with a World Geodetic System 1984 (WGS-84) format, and the like.

The EAS alert may also include at least one parameter indicative of a characteristic, or characteristics, of the emergency that prompted the EAS alert. The characteristic may include, for example, an emergency type, a likelihood of occurrence (i.e., the likelihood that an event related to the emergency will occur), a severity of the emergency, a time frame (or time of day) within which the event associated with the emergency is expected to occur (or has occurred), a geographic extent of the alert area, an originator of the EAS alert, a time when the EAS alert was originated, or any combination thereof.

The parameters may be used to determine how the EAS alert is processed. For example, the emergency alert server 218 may determine a list of cellular sites (e.g., the BSSs 202) that are associated with, or capable of providing coverage to, the designated alert area to which the EAS alert is to be broadcast. The emergency alert server 218 may determine the list of cellular sites based upon the dynamically and/or statically defined alert area as indicated in the EAS alert received from the emergency alert network 216.

The emergency alert server 218 may generate an appropriate EAS alert signal and provide the EAS alert signal along with the list of cellular sites associated with the designated alert area to the broadcast server 220. The broadcast server 220 may provide to the wireless network 208 the EAS alert signal, the list of cellular sites associated with the designated alert areas, and instructions to broadcast the EAS alert signal to the designated alert areas via the list of cellular sites.

The wireless network 208 may broadcast the EAS alert signal to the communications device 100 via the list of cellular sites, such as the BSS 202 shown in FIG. 2. The wireless network 208 may utilize any appropriate broadcast technology to broadcast the EAS alert signal. Appropriate broadcast technologies include, but are not limited to, Cell Broadcast, Multimedia Broadcast/Multicast Service ("MBMS"), and video broadcast, (e.g., Digital Video broadcast-Handheld ("DVB-H"), and MediaFLO), WiFi, WiMAX, NOAA (National Oceanic And Atmospheric Administration) Weather Radio, FM/AM radio, television, SMR (specialized mobile radio), satellite radio, satellite telephone service, and LMR (land mobile radio), or any combination thereof.

The transceiver 104 of the communications device 100 may receive the broadcast EAS alert signal. As discussed above, upon receipt of one or more EAS alert signals, the processor 106 may cause the device 100 to render an EAS alert notification to the user based on one or more the parameters associated with the EAS alert.

In an embodiment, the wireless network 208, in conjunction with the broadcast server 220, the emergency alert server 218, and/or the database 222, may determine whether the device is outside of the designated alert area based on a location update received from the device 100. For example, the wireless network 208 may receive the location update from the communications device 100. The location update may be a signal that is periodically sent from the device 100. The signal may be indicative of the location of the device 100. Each location update received from the device 100 may be stored in the database 222.

After the emergency alert network 216 has issued the EAS alert, the wireless network 208 may compare the last received location of the device 100 with the designated alert area. If the device 100 is outside the designated alert area, the wireless network 208 may transmit an update location response to the device 100 via the BSS 202, though it will be appreciated that any suitable form of wireless messaging, such as short messaging service (SMS), may be used. The update location response from the wireless network 208 may indicate that the device 100 may not be within the designated alert area. The device 100 may then render a notification to the user accordingly.

Figure 3A:
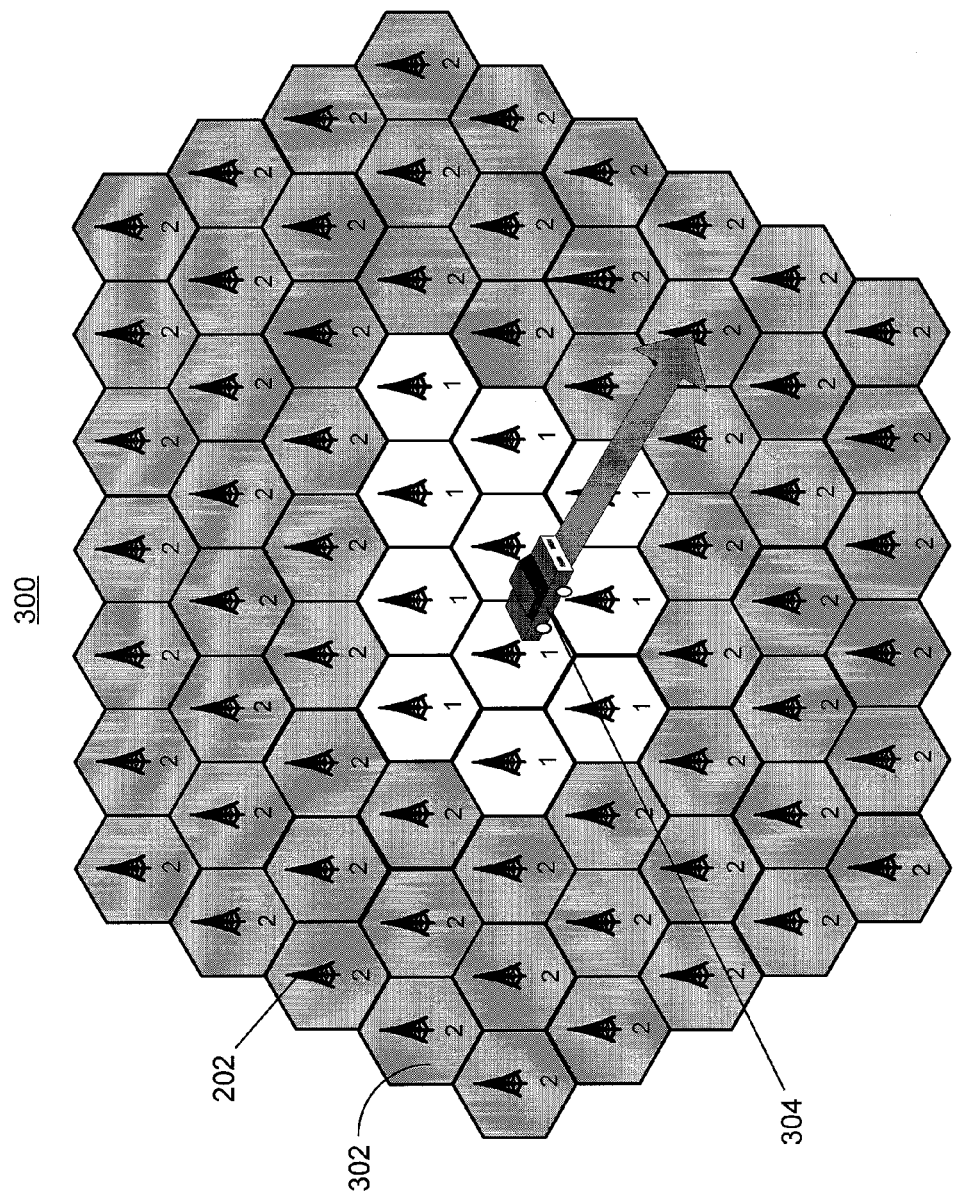
FIGS. 3A and 3B are diagrams illustrating example broadcast environments for delivering emergency alert system (EAS) messages and alerts over a wireless network.
Figure 3B:
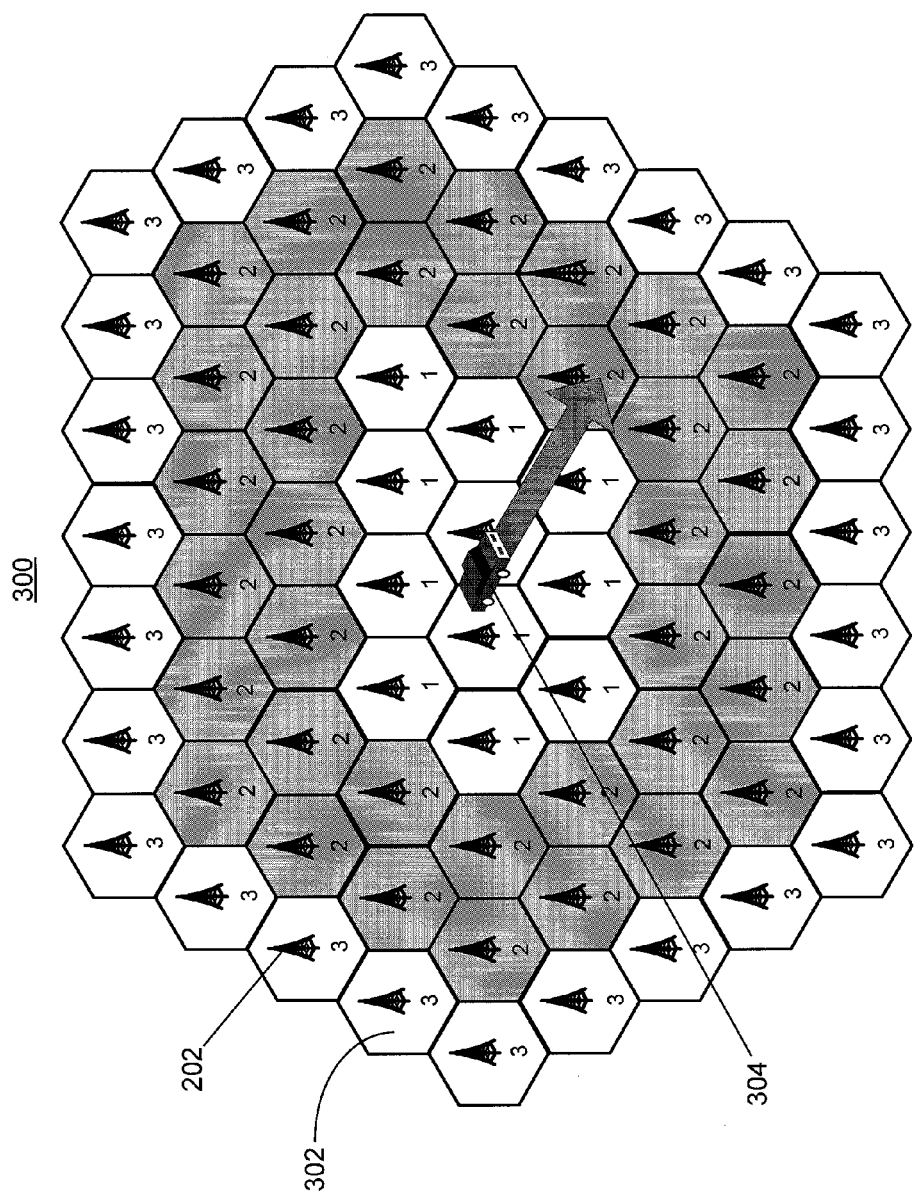

FIGS. 3A and 3B are diagrams illustrating an example broadcast environment 300 for delivering EAS alert signals and/or other related information to the communications device 100. The broadcast environment 300 may include numerous BSSs 202, each associated with a different geographic region, or cell 302. That is, each BSS 202 may be responsible for transmitting and receiving wireless signals in its respective cell 302. Though cells 302 are shown as having similar shapes and sizes, it will be appreciated that each cell 302 may have any number of shapes and sizes. In addition, it will be appreciated that the BSS 202 in a given cell 302 may have a broadcast range that at least partially overlaps with adjacent cells 302.

In an embodiment, each BSS 202 may be instructed to broadcast an EAS alert signal or a non-emergency signal based on the location of the BSS 202 with respect to a designated alert area. For example, the emergency alert network 216 may issue an EAS alert in response to an emergency. As shown in FIG. 3A, the EAS alert may be associated with a designated alert area that corresponds to cells 302-1. The emergency alert server 218 may determine a list of cellular sites (e.g., a list of the BSSs 202) that are associated with, or capable of serving, the designated alert area covered by the cells 302-1. As further shown in FIG. 3A, areas not covered by the issued EAS alert may correspond to cells 302-2. The wireless network 208 may cause the BSSs 202 located in each of the cells 302-1 to broadcast an EAS alert signal associated with the issued EAS alert. Thus, a user 304 traveling through one or more of the cells 302-1 may receive the EAS alert signal via the user's communications device 100. The device 100 may render an EAS alert notification using at least one of the display 108, the speaker 116, or the vibrating mechanism 118.

Upon receiving the notification from the device 100, the user 304 may attempt to evacuate the designated alert area, i.e., the user 304 may travel to a geographic area associated with any one of the cells 302-2. However, the user 304 may not be sure if or when he/she has reached a safe distance. Thus, the emergency alert server 218 may also determine a list of cellular sites that are adjacent to or near the designated alert area, and may cause these cellular sites to broadcast a non-emergency signal, such as an "all clear" signal.

For example, as shown in FIG. 3B, the designated alert area may correspond to the cells 302-1. Areas located adjacent to and/or immediately outside of the designated alert area may correspond to the cells 302-2. Areas far removed from the designated alert area may correspond to cells 302-3. After the EAS alert has been issued, the emergency alert server 218 may cause the BSSs 202 located in each of the cells 302-1 to broadcast the EAS alert signal associated with the issued EAS alert. The wireless network 208 may also cause the BSSs 202 located in each of the cells 302-2 to broadcast the "all clear" signal. The wireless network 208 may not broadcast any signals related to the issued EAS alert in the cells 302-3 because the cells are far removed from the designated alert area and, therefore, may not be affected by the emergency.

As the user 304 is traveling through one or more of the cells 302-1, the user 304 may receive the EAS alert signal via the user's communications device 100. The device 100 may render an EAS alert notification using at least one of the display 108, the speaker 116, or the vibrating mechanism 118. If the user 304 leaves the designated alert area and enters an area immediately surrounding the designated alert area, such as one of the cells 302-2, the user 304 may receive the "all clear" signal via the user's device 100. The device 100 may render a notification or message associated with the "all clear" signal using at least one of the display 108, the speaker 116, or the vibrating mechanism 118. Thus, the user 304 may be informed when he/she has reached a safe distance.

Figure 4A:
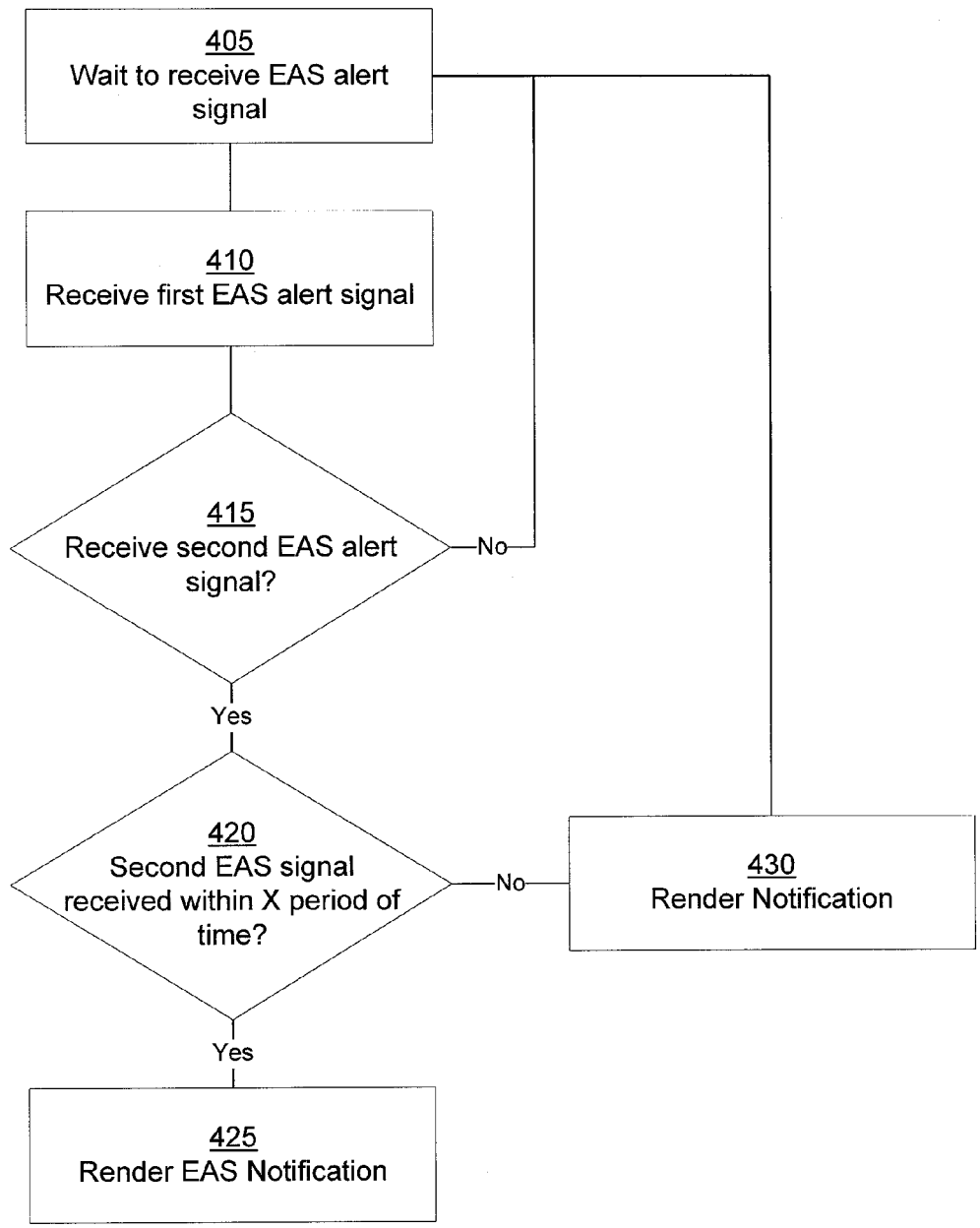
FIGS. 4A, 4B and 4C are flowcharts illustrating example device-based methods for determining whether a device is within or near a designated alert area.

FIG. 4A is a flowchart illustrating an example device-based method for determining whether the communications device 100 is outside a designated alert area. At 405, the communications device 100 may wait to receive an EAS alert signal from the wireless network 208. If there is a possibility of a dangerous event, such as an impending hurricane or tornado, the emergency alert network 216 may issue an EAS alert. The emergency alert network 216 may provide a signal indicative of the EAS alert and the geographic alert area, or areas, in which the alert is to be broadcast to the emergency alert server 218. The emergency alert server 218 may generate an EAS alert signal and determine a list of cellular sites (e.g., the BSSs 202) associated with, or capable of providing coverage to, the designated alert areas to which the EAS alert signal is to be broadcast. The emergency alert server 218 may provide the EAS alert signal and the list of cellular sites associated with the designated alert areas to the broadcast server 220. The broadcast server 220 may provide to the wireless network 208 the EAS alert signal, the list of cellular sites associated with the designated alert areas, and instructions to broadcast the EAS alert signal to the designated alert areas via the list of cellular sites.

At 410, the transceiver 104 of the communications device 100 may receive the broadcast EAS alert signal. The processor 106 may cause the communications device 100 to render an EAS alert notification indicative of the emergency.

At 415, the processor 106 may determine whether another EAS alert signal has been received. If another EAS alert signal has not been received, the process may proceed to 405 and the communications device 100 may continue to wait to receive additional EAS alert signals. If another EAS alert signal has been received, the process may proceed to 420. At 420, the processor 106 may determine whether the second EAS signal was received within a predetermined period of time of the first received EAS alert signal. For example, the processor 106 may determine whether the second EAS alert signal was received within three minutes of the first EAS alert signal, though any suitable time interval is consistent with an embodiment. If the second EAS alert signal was received within three minutes of the first received EAS alert signal, the process may proceed to 425 and the device 100 may continue to render the EAS alert notification.

If the second EAS alert signal was not received within three minutes of the first EAS alert signal, the process may proceed to 430. At 430, the communications device 100 may render a non-emergency notification to the user. The non-emergency notification may indicate to the user of the device 100 that the device 100 is outside the designated alert area. The process may then proceed to 405 and the communications device 100 may wait to receive additional EAS alert signals.

Figure 4B:
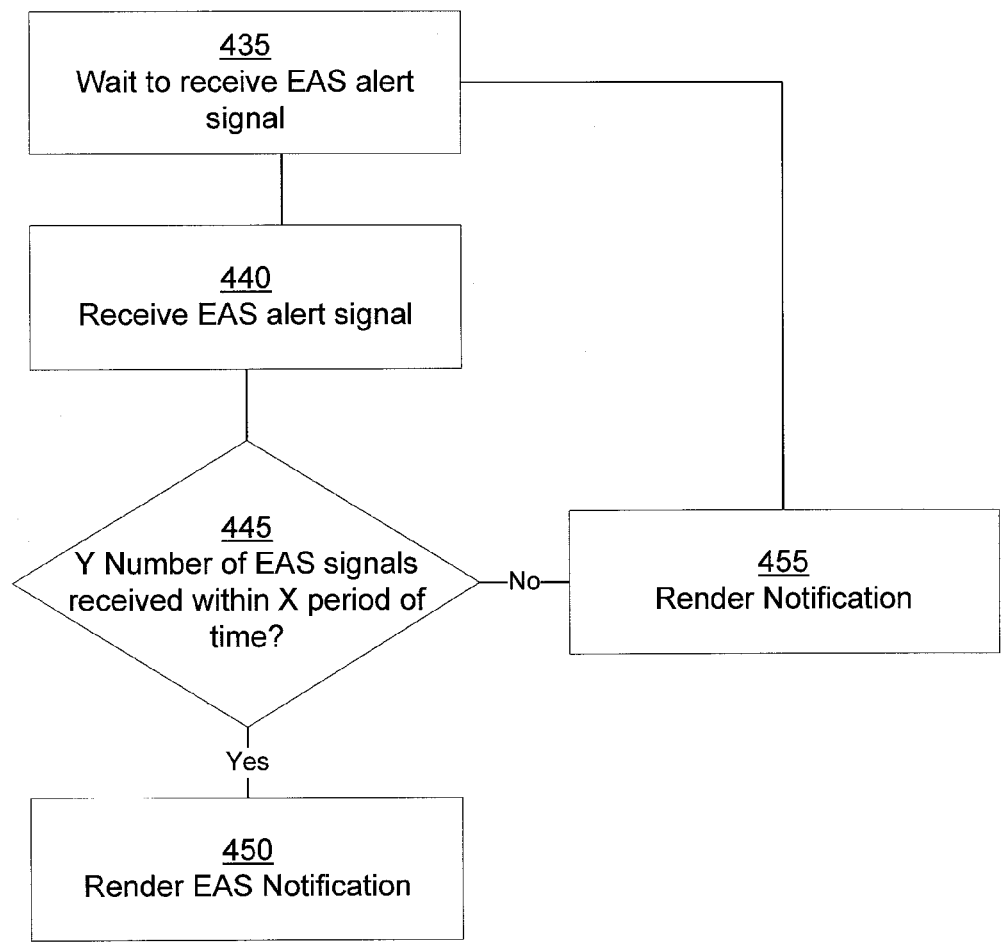

FIG. 4B is a flowchart illustrating another example device-based method for determining whether the communications device 100 is outside a designated alert area. At 435, the communications device 100 may wait to receive an EAS alert signal from the wireless network 208. The EAS alert signal may be broadcast in the same manner as discussed above with respect to FIG. 4A, for example.

At 440, the transceiver 104 of the communications device 100 may receive the broadcast EAS alert signal. At 445, the processor 106 may determine whether a predetermined number of EAS alert signals have been received within a predetermined period of time. For example, the processor 106 may determine whether five EAS alert signals have been received within a five-minute interval, though any suitable number of signals and time interval are consistent with an embodiment. If the predetermined number of EAS alert signals have been received within the predetermined time period, the process may proceed to 450. At 450, the processor 106 may cause the communications device 100 to render the EAS alert notification to the user.

If the predetermined number of EAS alert signals have not been received within the predetermined time period, the process may proceed to 455. At 455, the communications device 100 may render a non-emergency notification to the user. The non-emergency notification may indicate to the user of the device 100 that the device 100 is no longer within or near the designated alert area. The process may then proceed to 435 and the communications device 100 may wait to receive additional EAS alert signals.

Figure 4C:
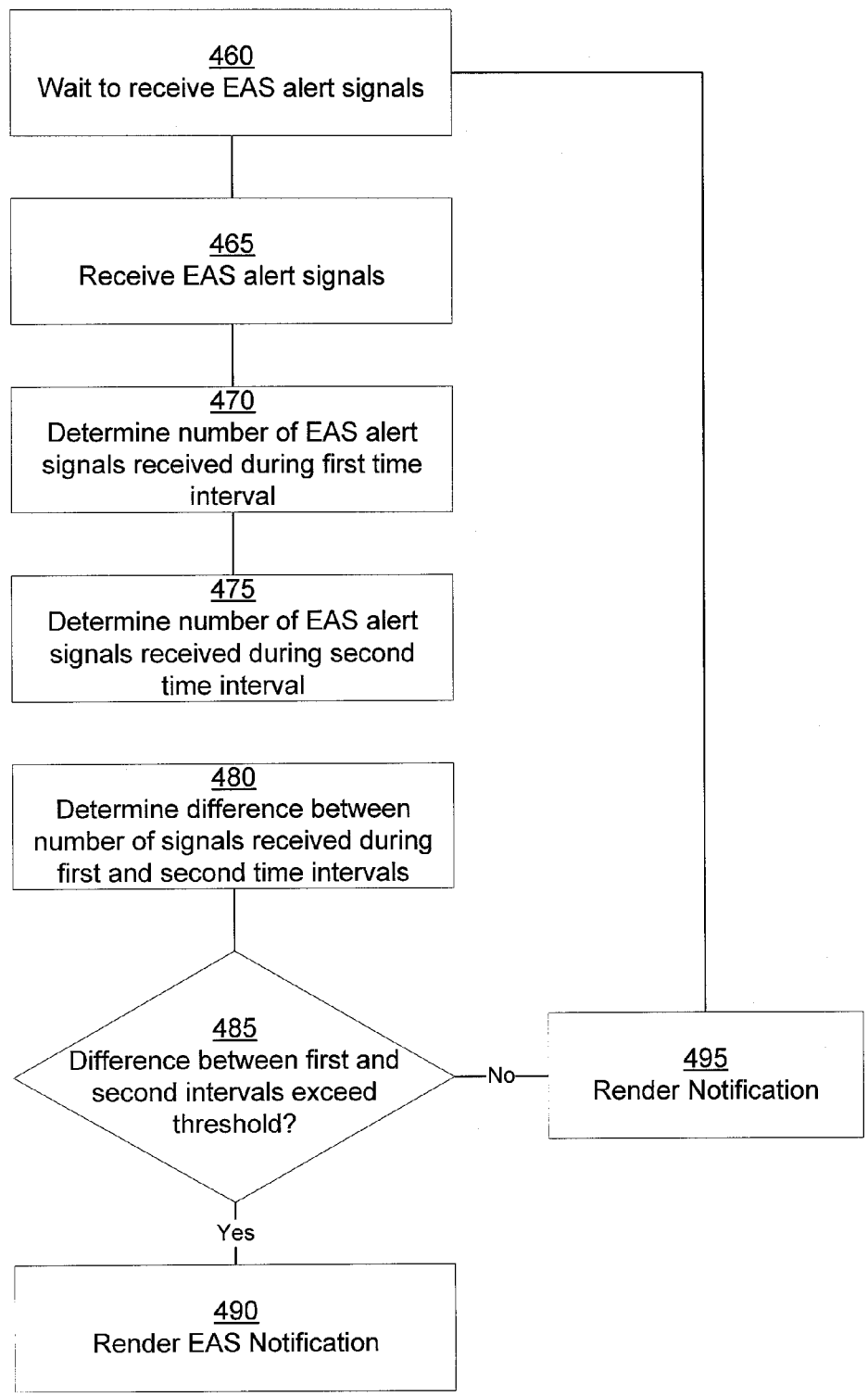

FIG. 4C is a flowchart illustrating yet another example device-based method for determining whether the communications device 100 is outside a designated alert area. At 460, the communications device 100 may wait to receive one or more EAS alert signals. At 465, the device 100 may receive one or more EAS alert signals. At 470, the device 100 may determine the number of EAS alert signals received during a first time interval. At 475, the device 100 may determine the number of EAS alert signals received during a second time interval. The second time interval may be before or after the first time interval. At 480, the device 100 may determine the difference between the number of EAS alert signals received during the first interval and the number of EAS alert signals received during the second time interval. At 485, the device 100 may determine if the difference between the number of received EAS alert signals during the first and second time intervals exceeds a predetermined threshold value or amount. If the difference exceeds the threshold value, the process may proceed to 490 and the device 100 may render the EAS alert notification to the user. If the difference does not exceed the threshold value, the process may proceed to 495. At 495, the device 100 may render a non-emergency notification to the user. The process may then proceed to 460 and the communications device 100 may wait to receive additional EAS alert signals.

For example, in one embodiment, the device 100 may receive ten EAS alert signals during a first five minute interval and may subsequently receive five EAS alert signals during a second five minute interval. The device 100 may determine the difference between the number of EAS alert signals received during the two time intervals. That is, the device 100 may determine that there is a difference of five EAS alert signals, or a difference of 50%, between the first and second time intervals. The device 100 may further determine if the difference represents an increase or a decrease in the number of received EAS alert signals. Thus, if ten ESA alert signals were received during the first time interval and five EAS alert signals were received during the second subsequent time interval, the device 100 may determine that there is a decrease of five EAS alert signals, or a decrease of 50%. The device 100 may then determine if the decrease exceeds a predetermined threshold value, which may be set to three, for example, though it will be appreciated that the threshold value may be defined as a percentage. After determining that the difference between the first and second time intervals exceeds the predetermined threshold value and that the difference represents a decrease in the number of received EAS alert signals, the device 100 may render a notification indicating that the device 100 is outside the designated alert area.

In another embodiment, the device 100 may receive five EAS alert signals during a first five minute interval and may subsequently receive ten EAS alert signals during a second five minute interval. The device 100 may determine that there is a difference of five EAS alert signals, or a difference of 50%, between the first and second time intervals and that the difference reflects an increase of 50% in the number of received EAS signals. The device 100 may determine if the difference exceeds a predetermined threshold value, which may be set to three, for example. After determining that the difference between the first and second time intervals exceeds the predetermined threshold value and that the difference represents an increase in the number of received EAS alert signals, the device 100 may render an EAS alert notification indicating that the device 100 is within the designated alert area.

Figure 5:
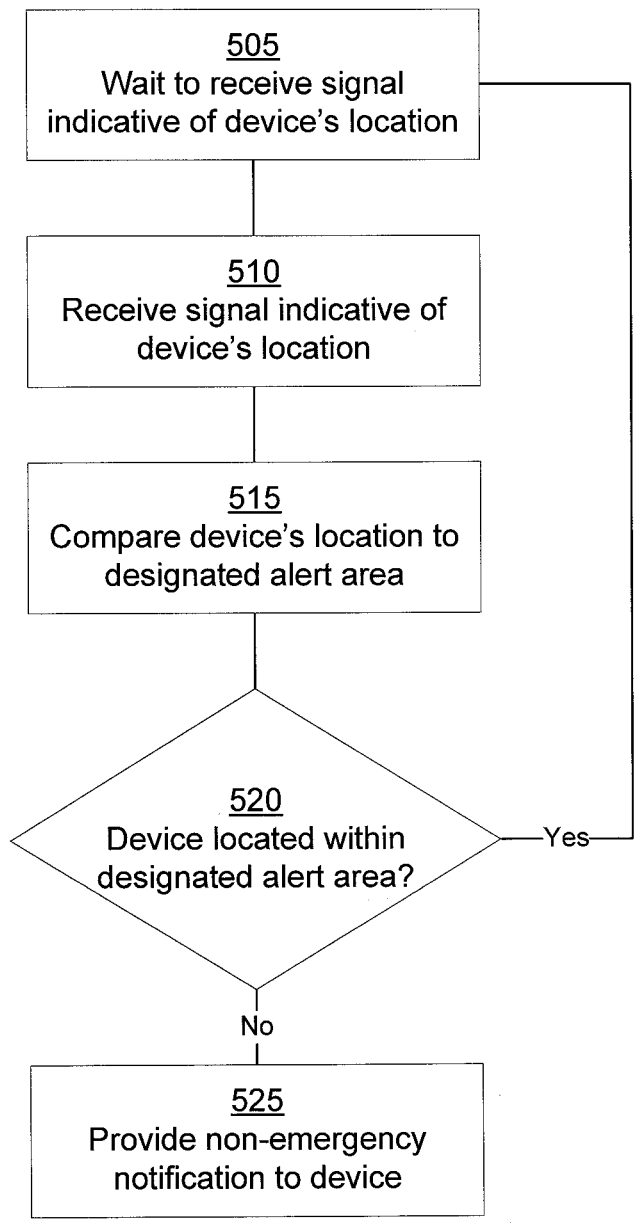
FIG. 5 is a flowchart illustrating an example network-based method for determining whether a device is within or near a designated alert area.

FIG. 5 is a flowchart illustrating an example network-based method for determining whether the communications device 100 is outside a designated alert area. At 505, the wireless network 208 may wait to receive a location update from the device 100. The location update may be a signal that is periodically sent from the device 100 and may be indicative of the location of the device 100. Each location update received from the device 100 may be stored in the database 222.

At 510, the wireless network 208 may receive the location update from the device 100. At 515, the wireless network 208, in conjunction with the broadcast server 220, the emergency alert server 218, and/or the database 222, may compare the location of the device 100 with the designated alert area. At 520, the wireless network 208, in conjunction with the broadcast server 220, the emergency alert server 218, and/or the database 222, may determine whether the device 100 is outside of the designated alert area based on the results of the comparison. If the device 100 is outside the designated alert area, the process may proceed to 525. At 525, wireless network 208 may transmit an update location response to the device 100 via the BSS 202, though it will be appreciated that any suitable form of wireless messaging, such as short messaging service (SMS), may be used. The update location response from the wireless network 208 may indicate that the device 100 is outside the designated alert area. The device 100 may then render a notification to the user accordingly. If at 520 it is determined that the device 100 is within or near the designated alert area, the process may proceed to 505 at the wireless network 208 may wait to receive additional location updates from the device 100.

Figure 6:
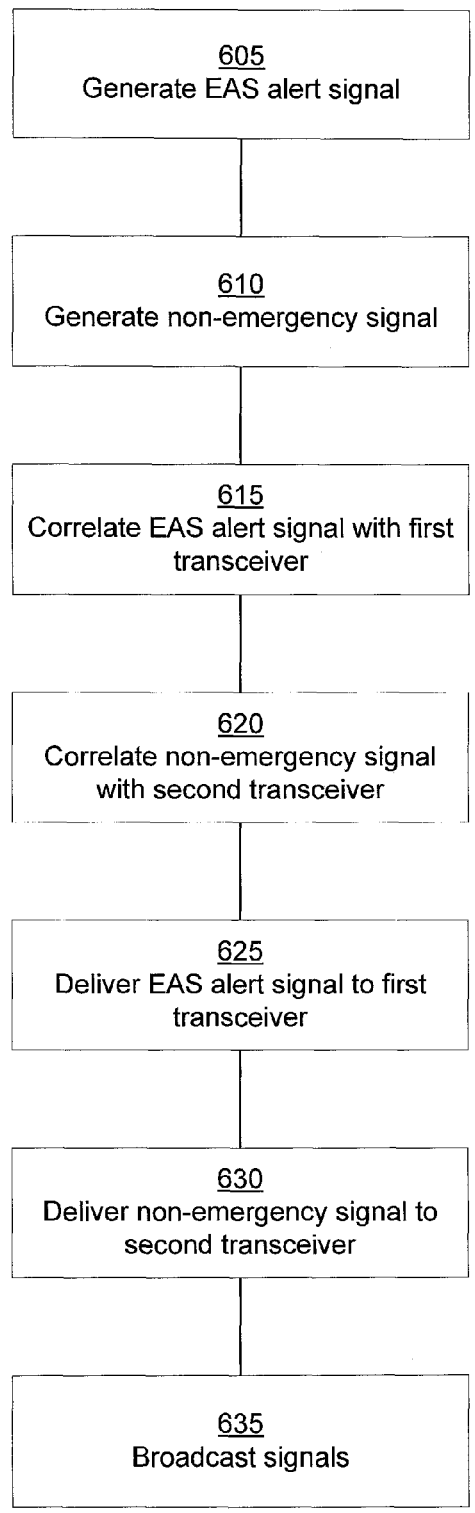
FIG. 6 is a flowchart illustrating an example broadcast-based method for determining whether a device is within or near a designated alert area.

FIG. 6 is a flowchart illustrating an example broadcast-based method for determining whether the communications device 100 is outside a designated alert area. At 605, the emergency alert server 218 may generate an EAS alert signal in response to an EAS alert issued by the emergency alert network 216. The generated EAS alert signal may be associated with the designated alert area (i.e., may include information regarding the size, shape, and/or geographic location of the designated alert area). The generated EAS alert signal may also include one or more characteristics of the emergency, such as an emergency type, a likelihood of occurrence (i.e., the likelihood that an event related to the emergency will occur), a severity of the emergency, a time frame (or time of day) within which the event associated with the emergency is expected to occur (or has occurred), an originator of the EAS alert, a time when the EAS alert was originated, and the like.

At 610, the emergency alert server 218 may also generate a non-emergency signal, which be associated with an area outside the designated alert area (i.e., may include information regarding the size, shape, and/or geographic location of the area outside the designated alert area and/or any type of information or message indicating that the device 100 is outside the designated alert area). For example, the non-emergency signal may include an "all clear" message, though any appropriate text is consistent with an embodiment.

At 615, the emergency alert server 218 may correlate the EAS alert signal with one or more BSSs 202 that are capable of broadcasting the EAS alert signal to the designated alert area. At 620, the emergency alert server 218 may correlate the non-emergency signal with one or more BSSs 202 that are capable of broadcasting the non-emergency signal to areas adjacent to or surrounding the designated alert area. For example, the emergency alert server 218 may correlate the non-emergency signal with BSSs 202 that are capable of broadcasting the non-emergency signal to any area within twenty-five miles of the designated alert area.

At 625, the emergency alert server 218 may provide the EAS alert signal and the list of BSSs 202 associated with the designated alert area to the broadcast server 220, which may deliver the EAS alert signal to the appropriate BSSs 202 via the wireless network 208. At 630, the emergency alert server 218 may provide the non-emergency signal and the list of BSSs 202 associated with the areas surrounding the designated alert area to the broadcast server 220, which may deliver the non-emergency signal to the appropriate BSSs 202 via the wireless network 208. At 635, the BSSs 202 in or near the designated alert areas may broadcast the EAS alert signal, and the BSSs 202 in or near the areas surrounding the designated alert area may broadcast the non-emergency signal.

As noted above, upon issuance of an EAS alert for a designated alert area, many individuals may be unaware or unsure as to whether their friends or family are affected by the alert. Thus, in an embodiment, the communications device 100 may used to provide notifications as to whether people-of-interest, such as friends, family members, coworkers, etc., are located within the designated alert area.

For example, a user may create a list of friends and family members that the user wishes to locate in case of an emergency. The members in the list may be identified by name, phone numbers, email addresses, relationship to the user, or by any other suitable means. The list may be created by the user via the device 100 or by any other computing device with access to the communications network 200, such as a client computer 214 shown in FIG. 2. The list may be part of the user's pre-provisioned profile, and may be stored in the database 222, though it will be appreciated that the list may be stored in any appropriate location in the communications network 200.

Upon being informed of an EAS alert, the user may send a request (e.g., a wireless signal) to the wireless network 208 via the communications device 100 to determine whether any of the members identified in the user's list are located in the designated alert area. The request may be forwarded to the emergency alert server 218, which may retrieve the user's list from the database 222. Using the identifiers in the list, such as each member's phone number, the emergency alert server 218 may determine the current location of each member based on the location of each member's mobile device, which may be the device 100. For example, the emergency alert server 218 may determine the location of each member via current registration location, last cell site, E911 location determination techniques, and the like.

The emergency alert server 218 may compare each determined location to the designated alert area. The results of the comparison may then be sent to the user's device 100. That is, for each member identified in the user's list that is located in the designated alert area, the emergency alert server 218 may generate and send a message (e.g., an SMS message) to the user's device 100 via the wireless network 208 indicating that the respective member is located within or near the designated alert area. For each member identified in the user's list that is located outside of the designated alert area, the emergency alert server 218 may also generate and send a message to the user's device 100 indicating that the respective member is located outside of the designated alert area.

It will be appreciated that the determined locations of the members may not be based on real-time information. That is, one or more of the members' devices 100 may be out of signal range or simply turned off and, therefore, may not have provided any location update information to the wireless network 208 for several hours. Consequently, some of the members' current locations may differ from the locations reflected in the last received location updates. This may cause the emergency alert server 218 to provide a false indication to the user regarding whether one or more members are located within or near a designated alert area. Thus, prior to sending a message to the user regarding the status of friends and family members, the emergency alert server 218 may be configured to first verify that the determined locations of the members are current.

For example, upon receiving the request from the user regarding whether any of the members identified in the user's list are located in the designated alert area, the emergency alert server 218 may determine when the wireless network 208 last received location updates from each of the members' devices 100. The wireless network 208 may then determine whether the timing of the updates is greater or less than a predetermined limit. For example, the wireless network 208 may determine if the location updates from the members' devices 100 were received within the last hour, though any suitable time period is consistent with an embodiment. For each location update received within the last hour, the emergency alert server 218 may generate and send a message to the user's device 100 regarding the location of the respective members with respect to the designated alert area. For each location update received more than an hour ago, the emergency alert server 218 may not generate or send any messages to the user regarding the location of the respective members. Alternatively, the emergency alert server 218 may generate and send a message informing the user that the members' locations could not be determined. Thus, by verifying that the determined locations of the members are current prior to sending status messages to the user, the potential for the user to receive false location information may be minimized.

In yet another embodiment, the emergency alert server 218 may be configured to automatically monitor the location of the members' devices 100. Upon issuance of the EAS alert, the emergency alert server 218 may automatically determine the location of each member and compare each location to the designated alert area. If the emergency alert server 218 determines that one of the members on the user's list is located within or near the designated alert area, the emergency alert server 218 may automatically generate and send a message, via the wireless network 208, to the member's device 100, though the message may be sent to fixed-line devices as well. The message may include a request asking the member for additional information, such as "are you okay?," "are you aware of the alert?," "are you taking appropriate preventative actions?," and the like.

The message may also include a predetermined response that may be selected by the member. For example, the predetermined response may read "I'm OK," which may be rendered on the display 108 of the member's device 100. Alternatively, the predetermined response may be stored in the memory 110 and may be automatically displayed by the member's device 100 upon receiving the message from the wireless network 208. The member may send the predetermined response by selecting a predetermined button on the input component 112. The response may be transmitted to the wireless network 208 via the transceiver 104. Upon receiving the response, the wireless network 208 may then forward the response to the user for rendering on the user's device 100.

Figure 7A:
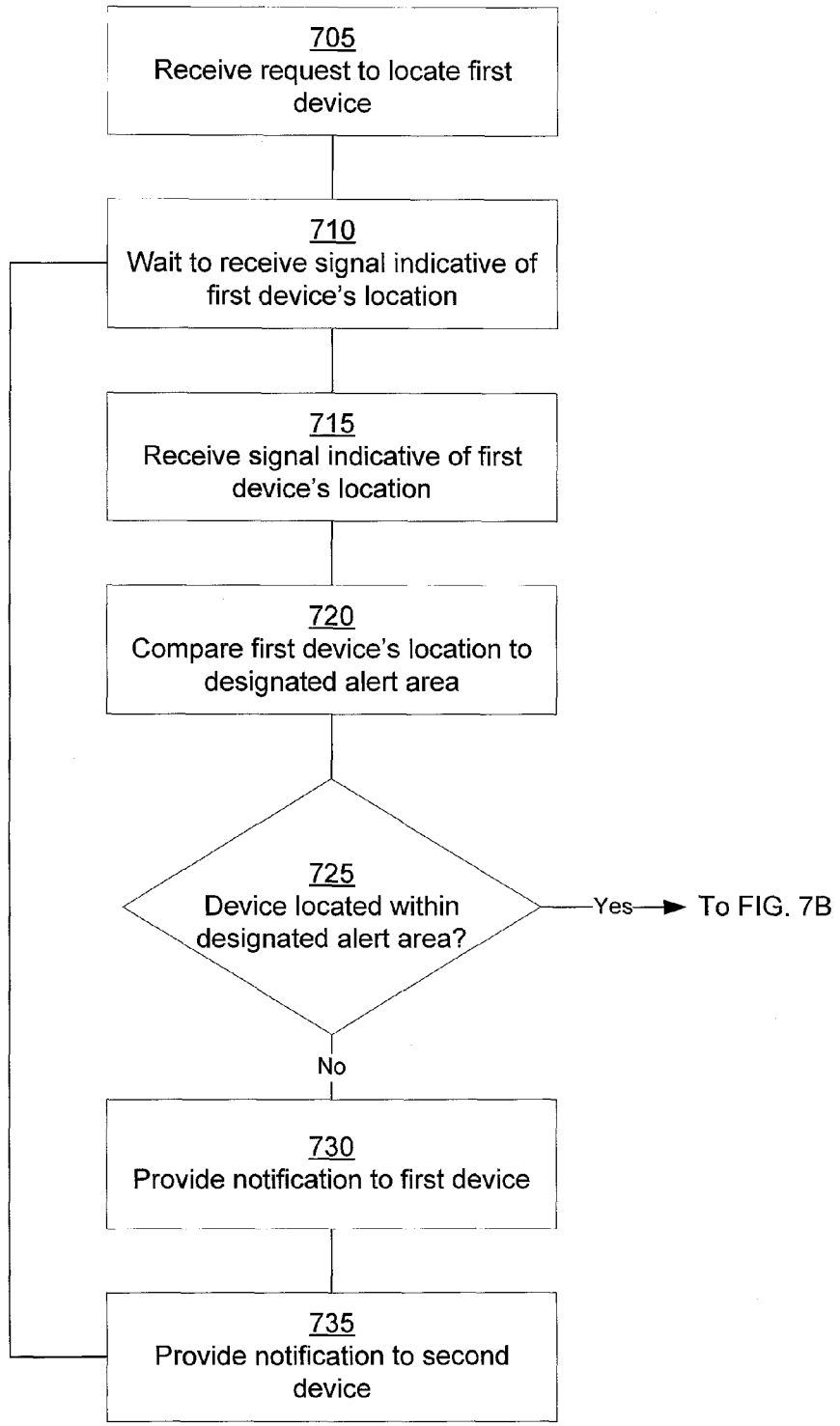
FIGS. 7A and 7B are flowcharts illustrating an example method for determining whether a first device is within or near a designated alert area and notifying a second device accordingly.
Figure 7B:
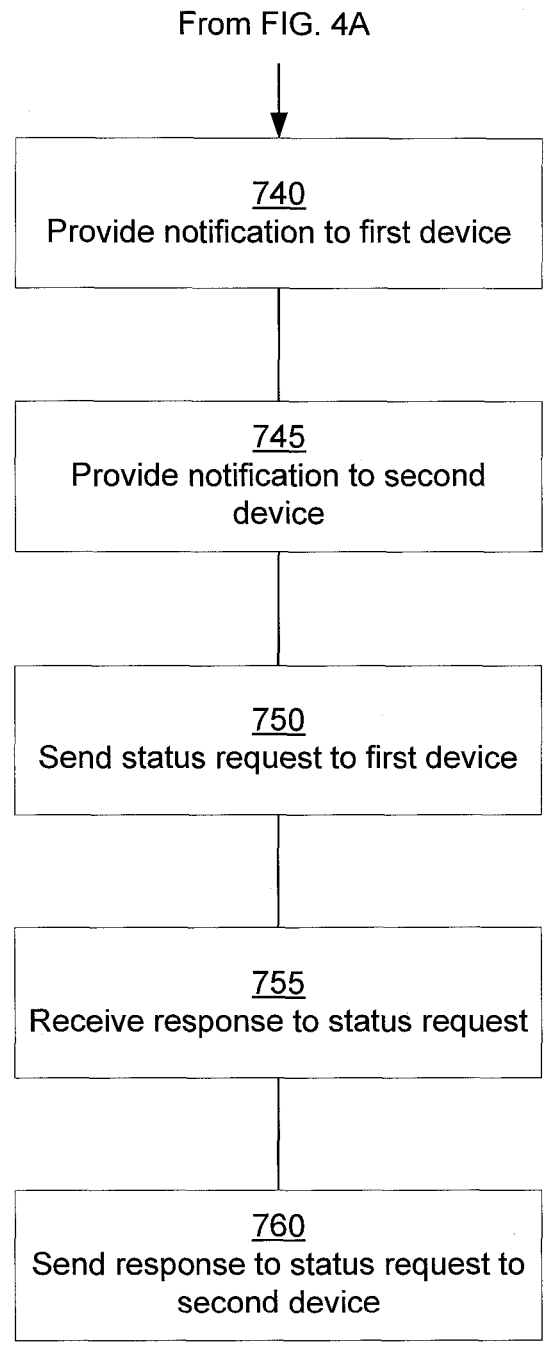

FIGS. 7A and 7B are flowcharts illustrating an example method for determining whether a person-of-interest, such as a friend or family member, is within or near a designated alert area and for notifying a user accordingly. At 705, the emergency alert server 218 may receive a request from the user to locate a friend's device 100, for example. The request may be sent by the user from any suitable device having access to the wireless network 208, such as the communications device 100 or the client computer 214.

At 710, the emergency alert server 218 may wait to receive a signal from the friend's device 100 indicative of the location of the friend's device 100. At 715, the emergency alert signal may receive the signal indicative of the location of the friend's device 100. It will be appreciated that the emergency alert server 218 may receive the signal prior to receiving the request to locate the friend's device 100. The location information may be stored in any database within, or connected to, the wireless network 208, such as the database 222.

At 720, the emergency alert server 218 may access the location information from the database 222 and compare the received location information to the designated alert area. At 725, the emergency alert server 218 may determine whether the friend's device 100 is located within or near the designated alert area. For example, the emergency alert server 218 may determine whether the friend's device 100 is within the designated alert area or within five miles of the designated alert area. If the device 100 is not located within or near the designated alert area, the wireless network 208 may provide a suitable notification, such as a SMS message, to the friend's device 100 at 730. The emergency alert server 218 may also provide the notification to the user that requested the location of the friend's device 100, at step 735. For example, the emergency alert server 218 may send an SMS message to the user's device 100 or an email to the user's home computer indicating that the friend's device 100 is not within or near the designated alert area.

If at 725 the wireless network 208 determines that the friend's device 100 is located within or near the designated alert area, the process may proceed to 740 in FIG. 7B. At 740, the emergency alert server 218 may provide a notification, such as a SMS message, to the friend's device 100. The friend's device 100 may render an EAS alert notification in response to the notification from the emergency alert server 218. At 745, the emergency alert server 218 may also provide the notification to the user that requested the location of the friend's device 100. For example, the wireless network 208 may send an SMS message to the user's device 100 or an email to the user's home computer indicating that the friend's device 100 is within or near the designated alert area.

At step 750, the emergency alert server 218 may also send a status request to the friend's device 100 via the wireless network 208. For example, the status request may be a SMS message asking the friend for additional information. The request may include such questions as "are you okay?," "are you aware of the alert?," "are you taking appropriate preventative actions?," and the like. The status request may further include a predetermined response that may be selected by the friend. For example, the predetermined response may read "I'm OK," which may be rendered by the friend's device 100. Alternatively, the predetermined response may be stored in the friend's device 100 and may be automatically displayed upon receiving the request from the wireless network 208. The friend may send the predetermined response by selecting a predetermined button on the friend's device 100, for example. The response may be transmitted to the wireless network 208 via the transceiver 104.

At 755, the emergency alert server 218 may receive the response to the status request from the friend's device 100. At 760, the emergency alert server 218 may forward the response via the wireless network 208 to the to the user that requested the location of the friend's device 100. For example, the wireless network 208 may forward the response to the user's device 100 or the user's home computer.

In many situations, it may be useful for the originator of the issued EAS alert, such as the EOC, to know whether one or more EAS alert signals have been received by specific public and/or private entities. In particular, the EAS originator may want to know whether the EAS alert signal was received by critical public and/or private infrastructure, such as hotels, schools, shopping malls, libraries, government offices, fire departments, police departments, and the like. In areas of high population density, the risks associated with an emergency may be increased. As such, the EAS originator may want to be sure that any appropriate public and/or private agencies are prepared for and capable of responding to the emergency. Typically, if the EAS originator is not sure whether the appropriate agencies have received the EAS alert signal, the EAS originator may attempt to call or reach each agency individually via whatever communications means are currently available. If the number of agencies to be called is large, the EAS originator may have to make decisions as to who will be called first. Such priority decisions may be subjective (i.e., the decisions may reflect the personal preferences of the personnel making the decisions). Thus, in yet another embodiment, the computer program 120 stored in the device 100 may be configured to enable the processor 106 to provide a response over the wireless network 208 via the transceiver 104 indicating that the device 100 has received an EAS alert signal.

For example, the communications device 100 may be assigned to a particular public or private entity, such as a hospital, and/or to personnel associated with the entity. Upon receipt of the EAS alert signal at the transceiver 104, the processor 106 may cause the device 100 to render the EAS alert notification to a hospital employee by text, audio tones, vibration, etc. In addition, the device 100 may request that the hospital employee acknowledge receipt of the EAS alert signal. For example, the processor 106 may cause the display 108 to render text asking the employee to press a button on the input component 112 acknowledging receipt of the EAS alert signal. If the employee presses the button, the processor 106 may generate data indicating that the employee has acknowledged receipt and may cause the transceiver 104 to transmit the data over the wireless network 208.

Alternatively, upon receiving the EAS alert signal, the computer program 120 may be configured to enable the processor 106 to recognize the received signal as an EAS alert signal. The processor 106 may then automatically generate the data indicating that the EAS alert signal has been received at the device 100 and may cause the data to be transmitted over the wireless network 208. Consequently, no action may be required by the user to acknowledge receipt of the EAS alert signal.

In another embodiment, the device 100 may enable an EAS alert responder (e.g., a hospital employee, emergency medical technician (EMT), police officer, etc.) to provide a response indicating whether he or she can respond to the emergency associated with the EAS alert signal. More specifically, in addition to or lieu of acknowledging receipt of the EAS alert signal, the EAS alert responder may use the device 100 to indicate readiness and/or availability. For example, upon receiving an EAS alert signal, the responder may press a button on the device 100 indicating that he or she is currently available, will be available sometime in the future (e.g., in 30 minutes), or is not available at all. The responder may also indicate whether he or she has the necessary equipment or supplies (e.g., fire equipment, rescue equipment, hazmat equipment, first-aid supplies, etc.), or needs to obtain such equipment and supplies, to respond to the emergency. The processor 106 may then cause the transceiver 104 to transmit the responder's readiness information, and location information, over the wireless network 208. Upon receiving the information, the EAS originator and/or any emergency dispatcher may redirect other available responders as necessary, calculate an estimated time of arrival (ETA), and/or direct necessary equipment and supplies to the responder.

The data transmitted from the device 100 may be routed to the emergency alert server 218, though it will be appreciated that the data may be routed to any appropriate agency and/or server that is connected to the network 200. It will further be appreciated that the data may be routed to other users connected to the network. For example, the data indicating that the EAS alert signal has been received and/or acknowledged at a user's device 100 may be routed to a friend or family member of the user. That is, the data may be routed to any device associated with the friend or family member that is connected to the network 200, such as a landline telephone, a home computer, a mobile telephone, a PDA, and the like.

Upon receipt of the data transmitted from the device 100, the emergency alert server 218 may use recent location information to map the location of the device 100 with respect to the designated alert area. The location information may be included in the data transmitted from the device 100 acknowledging receipt of the EAS alert signal. Alternatively, the recent location information may already be stored in the network 200, such as in the database 222, and may be determined in any number of ways, such as by way of current registration location, last cell site, E911 location determination techniques, and the like.

Using the mapped location, the emergency alert server 218 may verify that the EAS alert signal was properly broadcast by one or more of the BSSs 202. In other words, the emergency alert server 218 may verify that at least one acknowledgment was received from a device 100 in each of the areas covered by the list of cellular sites associated with the designated alert area.

For example, as shown in FIG. 3A, the user 304 may be currently located in the designated alert area, i.e., located in one of the cells 302-1. The user 304 may receive the EAS alert signal via the user's device 100 and may acknowledge receipt of the signal via the input component 112. The device 100 may then generate the data indicating that the signal has been received and transmit the data to the BSS 202 that corresponds to the cell 302-1 in which the user 304 is currently located. The data may be forwarded to the emergency alert server 218 via the wireless network 208. The emergency alert server 218 may determine the location of device 100 and map the location with respect to the designated alert area. The emergency alert server 218 may then use the mapped location to verify that the EAS alert signal was properly broadcast by the BSS 202 in the cell 302-1 in which the user 304 is located. The emergency alert server 218 may do this for each cell 302-1 in the designated alert area.

The emergency alert server 218 may also create and/or store a radio frequency (RF) propagation coverage map prior to, or during the broadcast of, the EAS alert signals. The RF propagation coverage map may indicate, in real-time, the broadcast coverage of the BSSs 202 in each of the cells 302. Thus, the RF propagation coverage map may indicate whether there is a change or a gap in the RF coverage pattern. The change or gap in RF coverage may be result of an inadequate number of BSSs 202 in a given area, or may be caused by the emergency event (e.g., a hurricane or tornado that takes one or more BSSs 202 out of service).

The emergency alert server 218 may overlay the RF propagation coverage map with the location of the devices 100 associated with critical public and/or private infrastructure (e.g., hotels, schools, shopping malls, libraries, government offices, fire departments, police departments, etc.). The overlaid map may identify critical infrastructure in a designated alert area that may not receive EAS alert signals due to coverage gaps. The overlaid map may also identify critical infrastructure outside of the designated alert area that may receive EAS alert signals. With this information, the operator of the wireless network 208 may take appropriate steps to correct changes in the RF coverage or to eliminate coverage gaps, thereby increasing the likelihood that all critical infrastructure will receive the broadcast EAS alert signals.

For example, the operator of the wireless network 208 may eliminate RF coverage gaps by increasing the broadcast range of the BSSs 202 closest to the coverage gaps. The BSSs 202 broadcast range may be increased by increasing the broadcast power of the BSSs 202. The operator of the wireless network 208 may also eliminate RF coverage gaps by setting up temporary broadcast towers (e.g., a cellular-on-wheels) in the affected areas.

Figure 8:
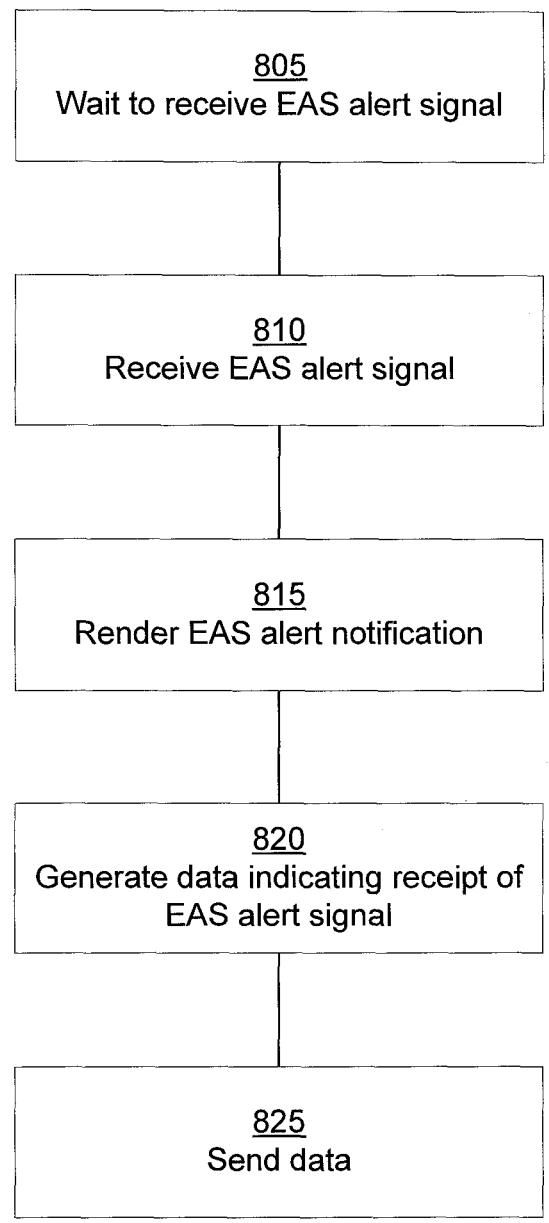
FIG. 8 is a flowchart illustrating an example method for determining whether a device has received an EAS alert associated with a designated alert area.

FIG. 8 is a flowchart illustrating an example method for indicating whether the communications device 100 has received an EAS alert signal associated with a designated alert area. At 805, the communications device 100 may wait to receive the EAS alert signal from the wireless network 208. At 810, the communications device 100 may receive the EAS alert signal. At 815, the communications device 100 may render an EAS alert notification. At 820, the communications device 100 may also generate data indicating that the device 100 has received the EAS alert signal. For example, the data may include a response acknowledging that the signal was received. The data may be generated automatically by the device 100 upon receipt of the EAS alert signal. Alternatively, the data may be generated in response to user input, such as the press of a button or a scroll wheel on the device 100. At 825, the device 100 may transmit the data to the wireless network 208 for further processing.

Figure 9:
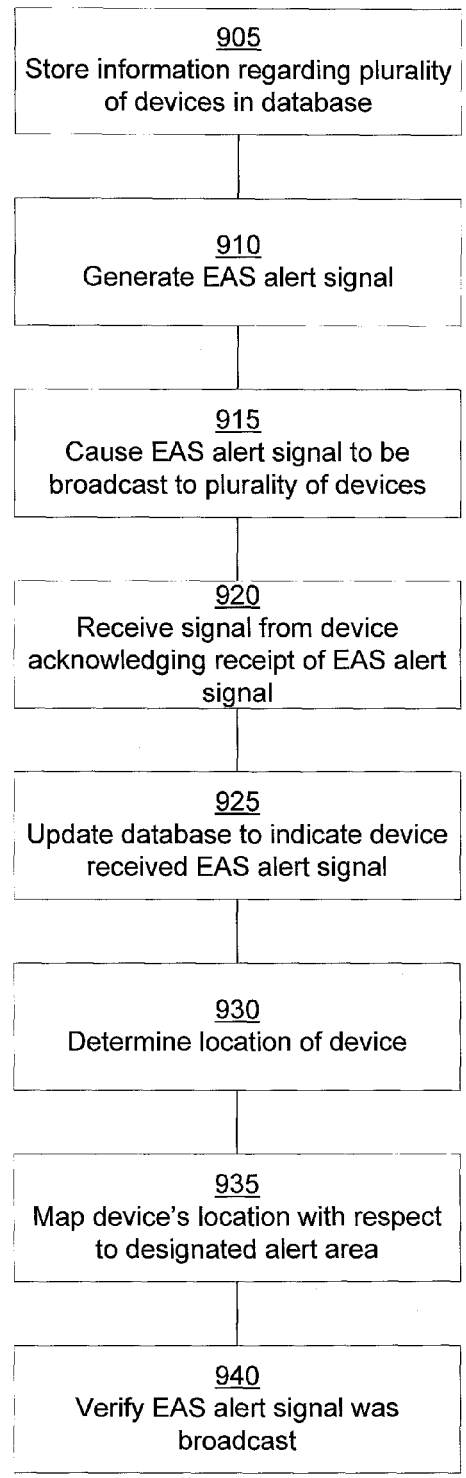
FIG. 9 is a flowchart illustrating an example method for verifying whether an EAS message or alert was properly broadcast.

FIG. 9 is a flowchart illustrating an example method for verifying whether the communications device 100 received the EAS alert signal and/or whether the EAS alert signal was properly broadcast. At 905, the emergency alert server 218 may store information in the database 222 regarding numerous communications devices 100. For example, the database 222 may include information associating a particular device 100 with a specific end user or location, such as a hospital or a public school. At 910, the emergency alert server 218 may generate the EAS alert signal in response to an EAS alert issued by the emergency alert network 216. The EAS alert signal may be passed to the broadcast server 220, which may cause the EAS alert signal to be broadcast to the numerous devices 100 via the wireless network 208 and the BSSs 202, at step 915. At 920, the wireless network 208 may receive a signal from one or more of the devices 100 indicating that the devices 100 received the EAS alert signal.

At 925, the emergency alert server 218 may update the database 222 to indicate which devices 100 received the EAS alert signal. At 930, the emergency alert server 218 may determine the location of each device 100 that acknowledged receipt of the EAS alert signal. At 935, the emergency alert server 218 may map the location of each device 100 with respect to the designated alert area. At 940, the emergency alert server 218 may use the mapped locations to verify that the EAS alert signal was properly broadcast by the BSSs 202. For example, the emergency alert server 218 may verify that at least one acknowledgement was received from devices 100 located in each of the areas served by the BSSs 202 that are responsible for broadcasting the EAS alert signal.

The following description sets forth exemplary telephony radio networks and non-limiting operating environments for implementing aspects of one or more embodiments of the present disclosure. The following operating environments should be considered non-exhaustive, however, and are intended to illustrate how one or more of the embodiments may be incorporated into existing network structures and architectures. It can be appreciated, however, that the embodiments can be incorporated into existing and/or future alternative architectures for communication networks as well.

The global system for mobile communication ("GSM") is one of the most widely utilized wireless access systems in today's fast growing communication environment. The GSM provides circuit-switched data services to subscribers, such as mobile telephone or computer users. The General Packet Radio Service ("GPRS"), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art can appreciate, the exemplary GSM/GPRS environment and services described herein also can be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1× Evolution Data Optimized ("EVDO"), Code Division Multiple Access-2000 ("cdma2000 3×"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that become available in the future. In this regard, the techniques related to the disclosed embodiments can be applied independently of the method for data transport, and do not depend on any particular network architecture, or underlying protocols.

Figure 10:
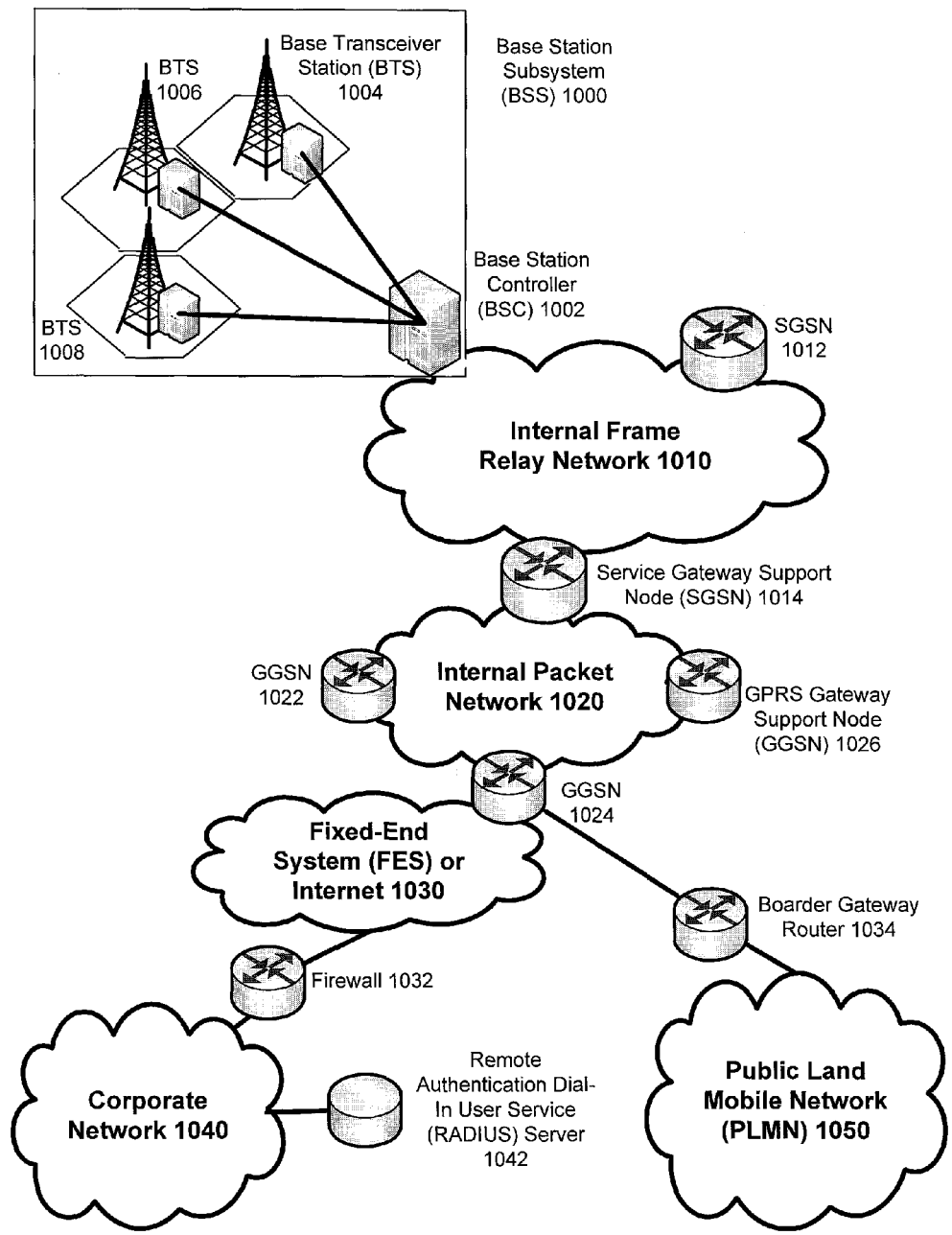
FIG. 10 is a block diagram of an exemplary packet-based mobile cellular network environment, such as a GPRS network, in which aspects of an embodiment may be implemented.

FIG. 10 depicts an overall block diagram of an exemplary packet-based mobile cellular network environment, such as a GPRS network, in which aspects of one or more embodiments may be implemented. In an example configuration, the wireless network 208 may be encompassed by the network environment depicted in FIG. 10. In such an environment, there may be a plurality of Base Station Subsystems ("BSS")

1000 (only one is shown), each of which comprises a Base Station Controller ("BSC") 1002 serving a plurality of Base Transceiver Stations ("BTS"), such as BTSs 1004, 1006, and 1008. The BTSs 1004, 1006, 1008 are the access points where users of packet-based mobile devices (e.g., the communications device 100) become connected to the wireless network.

In exemplary fashion, the packet traffic originating from one or more user devices (e.g., the communication device 100) may be transported via an over-the-air interface to the BTS 1008, and from the BTS 1008 to the BSC 1002. Base station subsystems, such as the BSS 1000, may be part of an internal frame relay network 1010 that may include a Service GPRS Support Nodes ("SGSN") such as SGSNs 1012, 1014. As shown in FIG. 10, the SGSN 1014 may be connected to an internal packet network 1020 through which the SGSN 1014 may route data packets to and from a plurality of gateway GPRS support nodes (GGSNs), such as GGSNs 1022, 1024, 1026. As illustrated, the SGSN 1014 and the GGSNs 1022, 1024, 1026 may be part of the internal packet network 1020. The GGSNs 1022, 1024, 1026 typically provide an interface to external Internet Protocol ("IP") networks such as a Public Land Mobile Network ("PLMN") 1050, corporate intranets 1040, or a Fixed-End System ("FES") or the public Internet 1030. As illustrated, a corporate network 1040 may be connected to the GGSN 1024 via a firewall 1032 and the PLMN 1050 may be connected to the GGSN 1024 via a boarder gateway router 1034. A Remote Authentication Dial-In User Service ("RADIUS") server 1042 may be used for caller authentication when a user of a mobile cellular device, such as communications device 100, calls the corporate network 1040.

Generally, there may be four different cell sizes in a GSM network, referred to as macro, micro, pico, and umbrella cells. The coverage area of each cell is different in different environments. Macro cells may be regarded as cells in which the base station antenna is installed in a mast or a building above average roof top level. Micro cells may be cells whose antenna height is under average roof top level. Micro-cells may typically be used in urban areas. Pico cells may include small cells having a diameter of a few dozen meters. Pico cells may be used mainly indoors. On the other hand, umbrella cells may be used to cover shadowed regions of smaller cells and/or fill in gaps in coverage between those cells.

Figure 11:
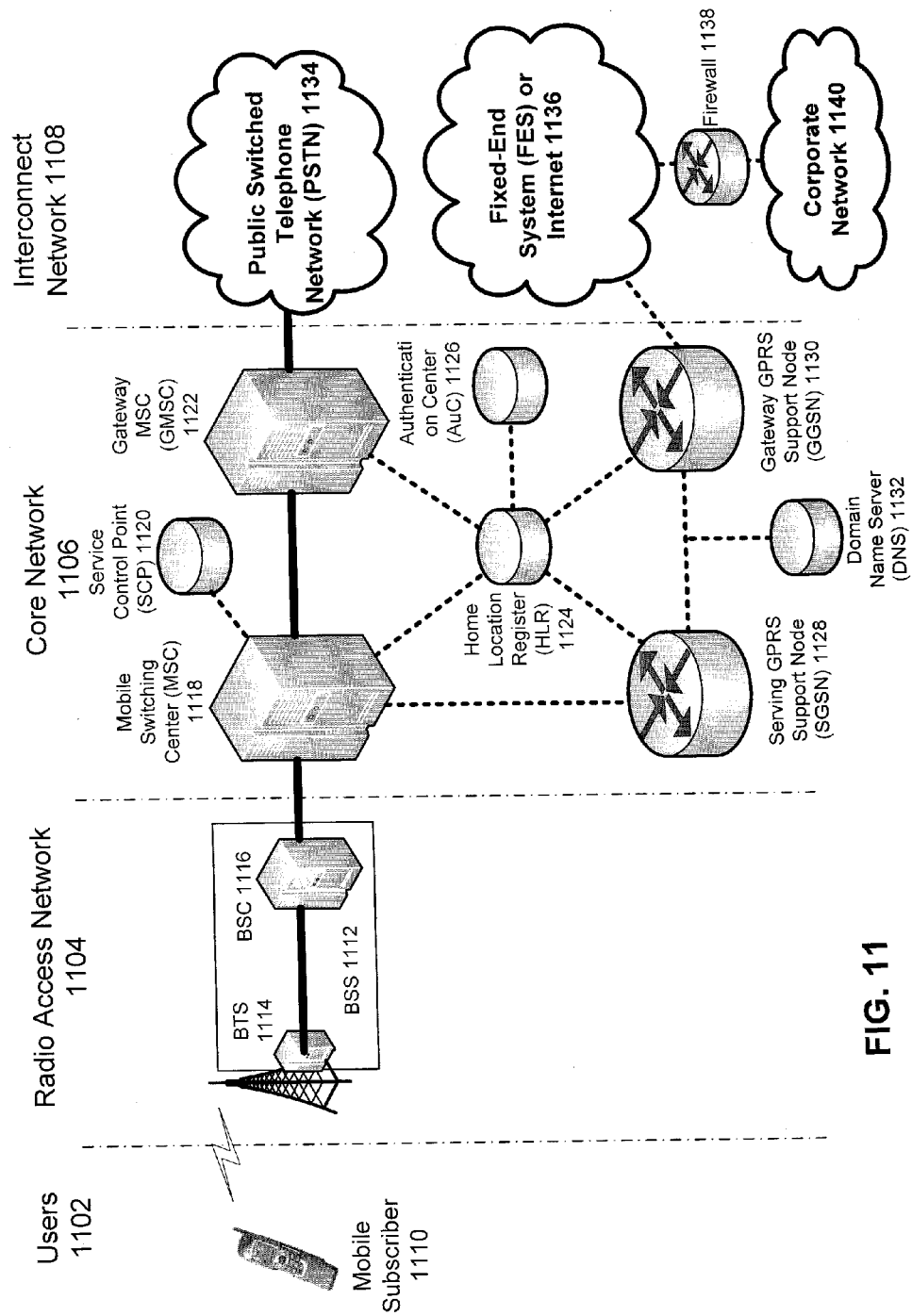
FIG. 11 is a diagram illustrating an example architecture of a GPRS network segmented into four groups.

FIG. 11 illustrates an architecture of a typical GPRS network as segmented into four groups: users 1102, a radio access network 1104, a core network 1106, and an interconnect network 1108. In an example configuration, the wireless network 208, shown in FIG. 2, may include the core network 1106. The users 1102 may include a plurality of end users (though only a single mobile subscriber 1110 is shown in FIG. 11). In an example embodiment, the device depicted as the mobile subscriber 1110 may include the communication device 100.

The radio access network 1104 may include a plurality of BSSs, such as a BSS 1112, which may include a BTS 1114 and a BSC 1116. The core network 1106 may have a host of various network elements. As shown in FIG. 11, the core network 1106 may have a Mobile Switching Center ("MSC") 1118, a Service Control Point ("SCP") 1120, a gateway MSC 1122, a SGSN 1128, a Home Location Register ("HLR") 1124, an Authentication Center ("AuC") 1126, a Domain Name Server ("DNS") 1132, and a GGSN 1130. The interconnect network 1108 may also include a host of various networks and network elements. For example, the interconnect network 1108 may include a Public Switched Telephone Network ("PSTN") 1134, a Fixed-End System ("FES") or Internet 1136, a firewall 1138, and a corporate network 1140.

The MSC 1118 may be connected to a large number of BSCs. At the MSC 1118, for instance, depending on the type of traffic, the traffic may be separated in that voice may be sent to the PSTN 1134 through the GMSC 1122, and/or data may be sent to the SGSN 1128, which then sends the data traffic to the GGSN 1130 for further forwarding.

When the MSC 1118 receives call traffic, for example, from the BSC 1112, the MSC 1118 may send a query to a database hosted by the SCP 1120. The SCP 1120 may process the request and issues a response to the MSC 1118 so that the MSC 1118 may continue call processing as appropriate.

The HLR 1124 often is a centralized database for subscribers to register to the GPRS network. The HLR 1124 may store static information about each subscriber, such as the International Mobile Subscriber Identity ("IMSI"), subscribed services, and a key for authentication. The HLR 1124 may also store dynamic subscriber information such as the subscriber's current location. Associated with the HLR 1124 is the AuC 1126. The AuC 1126 may be a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as the communications device 100, used by an end user of the mobile cellular service. When a mobile subscriber turns on his or her communications device 100, the device 100 typically goes through an attach process by which the device 100 attaches to a SGSN of the GPRS network, such as the SGSN 1128 shown in FIG. 11. When mobile subscriber 1110 initiates the attach process by turning on the network capabilities of the communications device, an attach request may be sent by the device 100 to the SGSN 1128. The SGSN 1128 may then query another SGSN (not shown), to which the mobile subscriber 1110 was attached before, for the identity of the mobile subscriber 1110. Upon receiving the identity of the mobile subscriber 1110 from the other SGSN, the SGSN 1128 may request more information from the mobile subscriber 1110. This information is used to authenticate the mobile subscriber 1110 to the SGSN 1128 by the HLR 1124. Once verified, the SGSN 1128 may send a location update to the HLR 1124 indicating the change of location to a new SGSN, in this case the SGSN 1128. The HLR 1124 may notify the old SGSN, to which mobile subscriber 1110 was attached before, to cancel the location process for the mobile subscriber 1110. The HLR 1124 may then notify the SGSN 1128 that the location update has been performed. At this time, the SGSN 1128 may send an Attach Accept message to the communications device 100 associated with the mobile subscriber 1110. The communications device 100 may send an Attach Complete message to the SGSN 1128.

After attaching itself with the network, the mobile subscriber 1110 may then go through the authentication process. In the authentication process, the SGSN 1128 may send the authentication information to the HLR 1124, which may send information back to the SGSN 1128 based on the subscriber's profile that was part of the subscriber's initial setup. The SGSN 1128 may then send a request for authentication and ciphering to the communications device 100 associated with the mobile subscriber 1110. The communications device 100 may use an algorithm to send the user identification (ID) and password to the SGSN 1128. The SGSN 1128 may use the same algorithm and compare the result. If a match occurs, the SGSN 1128 typically authenticates the mobile subscriber 1110.

Next, the communications device 100 establish a user session with the destination network, such as the corporate network 1140, by going through a Packet Data Protocol ("PDP") activation process. Briefly, in the process, the communications device 100 may request access to an Access Point Name ("APN"), such as UPS.com. The SGSN 1128 may receive the activation request from the communications device 100. The SGSN 1128 may then initiate a Domain Name Service ("DNS") query to learn which GGSN node has access to the UPS.com APN. The DNS query may be sent to the DNS server 1132 in the core network 1106, which may be provisioned to map to one or more GGSN nodes in the core network 1106. Based on the APN, the mapped GGSN 1130 may access the requested corporate network 1140. The SGSN 1128 may then send to the GGSN 1130 a Create Packet Data Protocol ("PDP") Context Request message that contains necessary information. The GGSN 1130 may send a Create PDP Context Response message to the SGSN 1128, which may then send an Activate PDP Context Accept message to the communications device 100 associated with the mobile subscriber 1110.

Once activated, data packets of the call made by the mobile subscriber 1110 may then go through the radio access network 1104, the core network 1106, and the interconnect network 1108, in the particular fixed-end system or Internet 1136 and the firewall 1138 to reach corporate network 1140.

Thus, network elements that can invoke the functionality of sending and/or receiving EAS messages and alerts may include, but are not limited to, Gateway GPRS Support Node tables, Fixed End System router tables, firewall systems, VPN tunnels, and any number of other network elements as required by the particular digital network.

Figure 12:
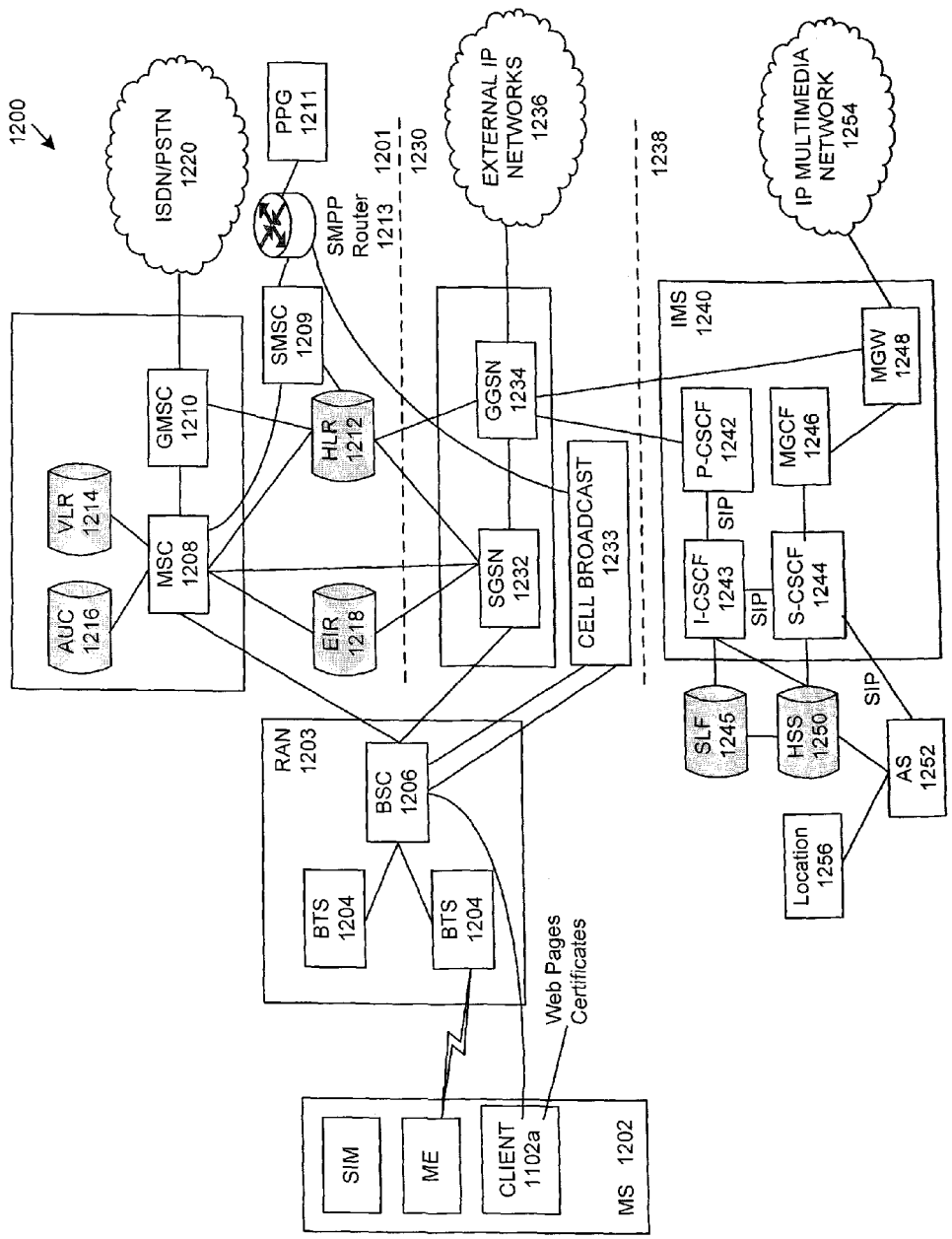
FIG. 12 is an alternate block diagram illustrating an exemplary GSM/GPRS/IP multimedia network architecture in which aspects of an embodiment may be implemented.

FIG. 12 illustrates another exemplary block diagram view of a GSM/GPRS/IP multimedia network architecture 1200 in which processing of an EAS alert can be incorporated. As illustrated, the architecture 1200 of FIG. 12 may include a GSM core network 1201, a GPRS network 1230 and an IP multimedia network 1238. The GSM core network 1201 may include a Mobile Station (MS) 1202, at least one Base Transceiver Station (BTS) 1204 and a Base Station Controller (BSC) 1206. The MS 1202 is typically physical equipment or mobile equipment (ME), such as a mobile phone or a laptop computer (e.g., communications device 100) that is used by a user or mobile subscriber, with a Subscriber identity Module (SIM). The SIM may include an International Mobile Subscriber Identity (IMSI), which is a unique identifier of the subscriber. The BTS 1204 is typically physical equipment, such as a radio tower, that enables a radio interface to communicate with the MS 1202. Each BTS 1204 may serve more than one MS 1202. The BSC 1206 may manage radio resources, including the BTS 1204. The BSC 1206 may be connected to several BTSs 1204. The BSC 1206 and BTS 1204 components, in combination, are generally referred to as a base station (BSS) or radio access network (RAN) 1203.

The GSM core network 1201 may also include a Mobile Switching Center (MSC) 1208, a Gateway Mobile Switching Center (GMSC) 1210, a Home Location Register (HLR) 1212, a Visitor Location Register (VLR) 1214, an Authentication Center (AuC) 1216, and an Equipment Identity Register (EIR) 1218. The MSC 1208 may perform a switching function for the network. The MSC 1208 may also perform other functions, such as registration, authentication, location updating, handovers, and call routing. The GMSC 1210 may provide a gateway between the GSM network and other networks, such as an Integrated Services Digital Network (ISDN) or Public Switched Telephone Networks (PSTNs) 1220. Thus, the GMSC 1210 may provide interworking functionality with external networks.

The HLR 1212 may be a database that contains administrative information regarding each subscriber registered in a corresponding GSM network. The HLR 1212 may also contain the current location of each MS 1202. The VLR 1214 may be a database that contains selected administrative information from the HLR 1212. The VLR 1214 may contain information necessary for call control and provision of subscribed services for each MS 1202 currently located in a geographical area controlled by the VLR 1214. The HLR 1212 and the VLR 1214, together with the MSC 1208, may provide the call routing and roaming capabilities of GSM. The AuC 1216 may provide the parameters needed for authentication and encryption functions. Such parameters may allow verification of a subscriber's identity. The EIR 1218 may store security-sensitive information about each MS 1202.

A Short Message Service Center (SMSC) 1209 may allow one-to-one Short Message Service (SMS) messages to be sent to/from the MS 1202. A Push Proxy Gateway (PPG) 1211 may be used to "push" (i.e., send without a synchronous request) content to the MS 1202. The PPG 1211 may act as a proxy between wired and wireless networks to facilitate pushing of data to the MS 1202. A Short Message Peer to Peer (SMPP) protocol router 1213 may be provided to convert SMS-based SMPP messages to cell broadcast messages. SMPP is a protocol for exchanging SMS messages between SMS peer entities such as SMSCs 1209. The SMPP protocol is often used to allow third parties, e.g., content suppliers such as news organizations, to submit bulk messages.

To gain access to GSM services, such as speech, data, and short message service (SMS), the MS 1202 may first register with the network to indicate its current location by performing a location update and IMSI attach procedure. The MS 1202 may send a location update including its current location information to the MSC/VLR, via the BTS 1204 and the BSC 1206. The location information may then be sent to the MS's HLR 1212. The HLR 1212 may be updated with the location information received from the MSC/VLR. The location update also is performed when the MS 1202 moves to a new location area. Typically, the location update is periodically performed to update the database as location updating events occur.

The GPRS network 1230 may be logically implemented on the GSM core network architecture by introducing two packet-switching network nodes, a serving GPRS support node (SGSN) 1232, a Cell Broadcast Center (CBC) 1233 and a Gateway GPRS support node (GGSN) 1234. The SGSN 1232 may be at the same hierarchical level as the MSC 1208 in the GSM network. The SGSN 1232 may control the connection between the GPRS network and the MS 1202. The SGSN may also keep track of the locations, security functions and access controls of each MS 1202.

The CBC 1233 may communicate cell broadcast messages that are typically delivered to multiple users in a specified area. Cell broadcast may be a one-to-many geographically focused service. It may enable messages to be communicated to multiple mobile phone customers who are located within a given part of its network coverage area at the time the message is broadcast.

The GGSN 1234 may provide a gateway between the GPRS network and a public packet network (PDN) or other IP networks 1236. That is, the GGSN 1234 may provide interworking functionality with external networks, and set up a logical link to the MS 1202 through the SGSN 1232. When packet-switched data leaves the GPRS network, it may be transferred to an external TCP-IP network 1236, such as an X.25 network or the Internet. In order to access GPRS services, the MS 1202 may first attach itself to the GPRS network by performing an attach procedure. The MS 1202 may then activate a packet data protocol (PDP) context, thus activating a packet communication session between the MS 1202, the SGSN 1232, and the GGSN 1234.

In a GSM/GPRS network, GPRS services and GSM services can be used in parallel. The MS 1202 may operate in one of three classes: class A, class B, and class C. A class A MS 1202 may attach to the network for both GPRS services and GSM services simultaneously. The class A MS 1202 may also support simultaneous operation of GPRS services and GSM services. For example, class A MSs 1202 may receive GSM voice/data/SMS calls and GPRS data calls at the same time.

A class B MS 1202 may attach to the network for both GPRS services and GSM services simultaneously. However, the class B MS 1202 may not support simultaneous operation of the GPRS services and GSM services. That is, the class B MS 1202 may only use one of the two services at a given time.

A class C MS 1202 may attach for only one of the GPRS services and GSM services at a time. Simultaneous attachment and operation of GPRS services and GSM services may not be possible with the class C MS 1202.

A GPRS network 1230 may be designed to operate in three network operation modes (NOM1, NOM2 and NOM3). A network operation mode of the GPRS network 1230 may be indicated by a parameter in system information messages transmitted within a cell. The system information messages may dictate the MS 1202 where to listen for paging messages and how signal towards the network. The network operation mode represents the capabilities of the GPRS network. In a NOM1 network, the MS 1202 may receive pages from a circuit switched domain (voice call) when engaged in a data call. The MS 1202 may suspend the data call or take both simultaneously, depending on the ability of the MS 1202. In a NOM2 network, the MS 1202 may not receive pages from a circuit switched domain when engaged in a data call, since the MS 1202 may be receiving data and may not be listening to a paging channel In a NOM3 network, the MS 1202 may monitor pages for a circuit switched network while received data and vise versa.

The IP multimedia network 1238 was introduced with 3GPP Release 5, and may include an IP multimedia subsystem (IMS) 1240 to provide rich multimedia services to mobile subscribers. A representative set of the network entities within the IMS 1240 may be a call/session control function (CSCF), a media gateway control function (MGCF) 1246, a media gateway (MGW) 1248, and a master subscriber database, called a home subscriber server (HSS) 1250. The HSS 1250 may be common to the GSM network 1201, the GPRS network 1230 as well as the IP multimedia network 1238.

The IP multimedia system 1240 is built around the call/session control function, of which there are three types: an interrogating CSCF (I-CSCF) 1243, a proxy CSCF (P-CSCF) 1242, and a serving CSCF (S-CSCF) 1244. The P-CSCF 1242 may be the MS's 1202 first point of contact with the IMS 1240. The P-CSCF 1242 may forward session initiation protocol (SIP) messages received from the MS 1202 to a SIP server in a home network (and vice versa) of the MS 1202. The P-CSCF 1242 may also modify an outgoing request according to a set of rules defined by the network operator (for example, address analysis and potential modification).

The I-CSCF 1243 may form an entrance to a home network and hide the inner topology of the home network from other networks and provide flexibility for selecting an S-CSCF 1244. The I-CSCF 1243 may contact a subscriber location function (SLF) 1245 to determine which HSS 1250 to use for the particular subscriber, if multiple HSS's 1250 are present. The S-CSCF 1244 may perform the session control services for the MS 1202. This may include routing originating sessions to external networks and routing terminating sessions to visited networks. The S-CSCF 1244 may also decide whether an application server (AS) 1252 is required to receive information on an incoming SIP session request to ensure appropriate service handling. This decision may be based on information received from the HSS 1250 (or other sources, such as an application server 1252). The AS 1252 may also communicate to a location server 1256 (e.g., a Gateway Mobile Location Center (GMLC)) that provides a position (e.g., latitude/longitude coordinates) of the MS 1202.

The HSS 1250 may contain a subscriber profile and keeps track of which core network node is currently handling the subscriber. It also supports subscriber authentication and authorization functions (AAA). In networks with more than one HSS 1250, a subscriber location function may provide information on the HSS 1250 that contains the profile of a given subscriber.

The MGCF 1246 may provide interworking functionality between SIP session control signaling from the IMS 1240 and ISUP/BICC call control signaling from the external GSTN networks (not shown). It may also control the media gateway (MGW) 1248 that provides user-plane interworking functionality (e.g., converting between AMR- and PCM-coded voice). The MGW 1248 may also communicate with other IP multimedia networks 1254.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

While example embodiments have been described in connection with various computing devices, the underlying concepts can be applied to any computing device or system capable of processing EAS alerts. The various techniques described herein can be implemented in connection with hardware or software or, where appropriate, with a combination of both. Thus, the methods and apparatus for implementing aspects of one or more embodiments may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for selectively processing a broadcast message. In the case of program code execution on programmable computers, the computing device will generally include a processor, a storage medium readable by the processor (including volatile and non-volatile memory and/or storage elements), at least one input device, and at least one output device. The program(s) may be implemented in assembly or machine language, if desired. In any case, the language may be a compiled or interpreted language, and combined with hardware implementations.

The methods and apparatus for the methods and apparatus for implementing aspects of one or more embodiments may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for selectively processing a broadcast message. When implemented on a general-purpose processor, the program code combines with the processor to provide a unique apparatus that operates to process EAS alerts. Additionally, any storage techniques used in connection with processing EAS alerts can invariably be a combination of hardware and software.

While the disclosed embodiments have been described in connection with the various figures, it is to be understood that other similar embodiments can be used or modifications and additions can be made to the disclosed embodiments for performing the same function(s) without deviating therefrom. For example, one skilled in the art will recognize that various instructions, not specifically disclosed herein, for determining the location of a device with respect to an emergency alert area may be utilized. Further, one skilled in the art will recognize that the embodiments disclosed herein may apply to any environment, whether wired or wireless, and may be applied to any number of devices connected via a communications network and interacting across the network. Therefore, the embodiments should be construed in breadth and scope in accordance with the appended claims.

What is claimed:

1. A device comprising:
  a processor; and
  memory coupled to the processor, the memory comprising executable instructions that when executed by the processor cause the processor to effectuate operations comprising:
    receiving a first emergency alert signal, the first emergency alert signal designating an emergency alert area;
    responsive to receiving the first emergency alert signal, counting a first number of emergency alert signals, including the first emergency alert signal, received within a first predetermined period of time;
    determining a second number of the emergency alert signals received within a subsequent predetermined period of time;
    based on a value of the first number of the emergency alert signals received, determining that the device is located outside a geographic boundary of the emergency alert area or within the geographic boundary of the emergency alert area; and
    determining that the device is outside a geographic boundary of the emergency alert area based on:
      whether an amount of time between two consecutively received of the emergency alert signals is within a predetermined amount of time; and
      whether a difference between the of the first number and a value of the second number exceeds a first predetermined threshold value.

2. The device of claim 1, wherein the determining that the device is outside of the geographic boundary of the emergency alert area is also based on when the value of the first number of the emergency alert signals received is less than a second predetermined threshold value.

3. The device of claim 1, the operations further comprising: determining that the device is within the geographic boundary of the emergency alert area when a value the first number of the emergency alert signals received is equal to or greater than a second predetermined threshold value.

4. The device of claim 1, wherein the first number of the emergency alert signals received within the predetermined period of time is a second predetermined number.

5. The device of claim 1, the operations further comprising:
  rendering, on the device, a notification that the device is within the emergency alert area.

6. The device of claim 1, the operations further comprising:
  rendering, on the device, a notification that the device is outside of the emergency alert area.

7. The device of claim 1, wherein the device comprises a wireless communications device.

8. The device of claim 1, the operations further comprising:
  generating data indicating that at least one emergency alert signal was received; and
  transmitting the data over a communications network.

9. The device of claim 8, the operations further comprising:
  generating the data in response to an acknowledgement of receipt of the emergency alert signals.

10. A method comprising:
  receiving a first emergency alert signal, the first emergency alert signal designating an emergency alert area;
  responsive to receiving the first emergency alert signal, counting a first number of emergency alert signals, including the first emergency alert signal, received within a first predetermined period of time;
  determining a second number of the emergency alert signals received within a subsequent predetermined period of time;
  based on a value of the first number of the emergency alert signals received, determining that the device is located outside a geographic boundary of the emergency alert area or within the geographic boundary of the emergency alert area; and
  determining that a device is outside a geographic boundary of the emergency alert area based on:
    whether an amount of time between two consecutively received of the emergency alert signals is within a predetermined amount of time; and
    whether a difference between the of the first number and a value of the second number exceeds a first predetermined threshold value.

11. The method of claim 10, wherein the determining that the device is outside of the geographic boundary of the emergency alert area is also based on when the value of the first number of the emergency alert signals received is less than a second predetermined threshold value.

12. The method of claim 10, further comprising:
  determining that the device is within the geographic boundary of the emergency alert area when a value the first number of the emergency alert signals received is equal to or greater than a second predetermined threshold value.

13. The method of claim 10, wherein the first number of the emergency alert signals received within the predetermined period of time is a second predetermined number.

14. The method of claim 10, further comprising:
  rendering, on the device, a notification that the device is within the emergency alert area.

15. The method of claim 10, further comprising:
  rendering, on the device, a notification that the device is outside of the emergency alert area.

16. The method of claim 10, wherein the device comprises a wireless communications device.

17. The method of claim 10, further comprising:
  generating data indicating that at least one emergency alert signal was received; and
  transmitting the data over a communications network.

18. The method of claim 17, further comprising:
  generating the data in response to an acknowledgement of receipt of the emergency alert signals.

19. A tangible computer readable storage medium that is not a transitory signal comprising computer executable instructions that when executed by a computing device cause said computing device to effectuate operations comprising:
- receiving a first emergency alert signal, the first emergency alert signal designating an emergency alert area;
- responsive to receiving the first emergency alert signal, counting a first number of emergency alert signals, including the first emergency alert signal, received within a first predetermined period of time;
- determining a second number of the emergency alert signals received within a subsequent predetermined period of time;
- based on a value of the first number of the emergency alert signals received, determining that the device is located outside a geographic boundary of the emergency alert area or within the geographic boundary of the emergency alert area; and
- determining that a device is outside a geographic boundary of the emergency alert area based on:
  - whether an amount of time between two consecutively received of the emergency alert signals is within a predetermined amount of time; and
  - whether a difference between the of the first number and a value of the second number exceeds a first predetermined threshold value.

20. The tangible computer readable storage medium of claim 19, wherein the determining that the device is outside of the geographic boundary of the emergency alert area is also based on when the value of the first number of the emergency alert signals received is less than a second predetermined threshold value.

21. The tangible computer readable storage medium of claim 19, the operations further comprising:
- determining that the device is within the geographic boundary of the emergency alert area when a value the first number of the emergency alert signals received is equal to or greater than a second predetermined threshold value.

22. The tangible computer readable storage medium of claim 19, wherein the first number of the emergency alert signals received within the predetermined period of time is a second predetermined number.

23. The tangible computer readable storage medium of claim 19, the operations further comprising:
- rendering, on the device, a notification that the device is within the emergency alert area.

24. The tangible computer readable storage medium of claim 19, the operations further comprising:
- rendering, on the device, a notification that the device is outside of the emergency alert area.

25. The tangible computer readable storage medium of claim 19, wherein the device comprises a wireless communications device.

26. The tangible computer readable storage medium of claim 19, the operations further comprising:
- generating data indicating that at least one emergency alert signal was received; and
- transmitting the data over a communications network.

27. The tangible computer readable storage medium of claim 26, the operations further comprising:
- generating the data in response to an acknowledgement of receipt of the emergency alert signals.

* * * * *